United States Patent
Kim et al.

(10) Patent No.: US 10,212,738 B2
(45) Date of Patent: Feb. 19, 2019

(54) METHOD FOR ADJUSTING CONTENTION WINDOW SIZE ON BASIS OF HARQ-ACK INFORMATION IN WIRELESS ACCESS SYSTEM SUPPORTING UNLICENSED BAND, AND DEVICE FOR SUPPORTING SAME

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Kijun Kim, Seoul (KR); Byounghoon Kim, Seoul (KR); Hanbyul Seo, Seoul (KR); Hanjun Park, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/573,435

(22) PCT Filed: May 12, 2016

(86) PCT No.: PCT/KR2016/005010
§ 371 (c)(1),
(2) Date: Nov. 10, 2017

(87) PCT Pub. No.: WO2016/182366
PCT Pub. Date: Nov. 17, 2016

(65) Prior Publication Data
US 2018/0139779 A1    May 17, 2018

Related U.S. Application Data

(60) Provisional application No. 62/238,706, filed on Oct. 8, 2015, provisional application No. 62/237,587, filed
(Continued)

(51) Int. Cl.
*H04W 74/08* (2009.01)
*H04L 1/00* (2006.01)
(Continued)

(52) U.S. Cl.
CPC ............ *H04W 74/085* (2013.01); *H04L 1/00* (2013.01); *H04L 1/18* (2013.01); *H04L 1/1812* (2013.01);
(Continued)

(58) Field of Classification Search
CPC ............ H04W 74/08; H04W 74/0833; H04W 74/0841; H04W 74/085; H04W 76/20;
(Continued)

(56) References Cited

U.S. PATENT DOCUMENTS

2016/0278088 A1* 9/2016 Cheng .................... H04L 47/27
2016/0345360 A1* 11/2016 Papaleo ................ H04W 74/08
(Continued)

OTHER PUBLICATIONS

PCT International Application No. PCT/KR2016/005010, Notification of Transmittal of the International Search Report and the Written Opinion of the International Searching Authority, or Declaration dated Aug. 12, 2016, 9 pages.
(Continued)

*Primary Examiner* — Kevin D Mew
(74) *Attorney, Agent, or Firm* — Lee, Hong, Degerman, Kang & Waimey PC

(57) ABSTRACT

The present invention relates to a wireless access system that supports an unlicensed band, and provides various methods for adjusting a contention window size, methods for determining the time when the adjusted contention window size is applied, methods for distinguishing between a collision and a channel error, and devices for supporting the same. As an embodiment of the present invention, a method for adjusting a contention window size in a wireless access
(Continued)

system supporting an unlicensed band may comprise the steps of: performing a channel access procedure; when it is determined through the performed channel access procedure that a serving cell (Scell) in the unlicensed band is in an idle state, transmitting a transmission burst including a downlink signal through the unlicensed band; receiving hybrid automatic repeat and request acknowledgment (HARQ-ACK) information corresponding to the transmission burst; and adjusting the CWS using the number of DTX states in the HARQ-ACK information when the transmission burst is scheduled in a self-carrier scheduling scheme.

10 Claims, 26 Drawing Sheets

Related U.S. Application Data on Oct. 6, 2015, provisional application No. 62/216,996, filed on Sep. 10, 2015, provisional application No. 62/213,119, filed on Sep. 2, 2015, provisional application No. 62/207,901, filed on Aug. 20, 2015, provisional application No. 62/204,411, filed on Aug. 12, 2015, provisional application No. 62/165,158, filed on May 21, 2015, provisional application No. 62/160,597, filed on May 12, 2015.

(51) Int. Cl.
  *H04L 1/18* (2006.01)
  *H04L 5/00* (2006.01)
  *H04W 76/28* (2018.01)
  *H04W 28/02* (2009.01)
  *H04W 28/26* (2009.01)

(52) U.S. Cl.
  CPC .............. *H04L 1/1887* (2013.01); *H04L 5/00* (2013.01); *H04W 28/0289* (2013.01); *H04W 28/26* (2013.01); *H04W 76/28* (2018.02)

(58) Field of Classification Search
  CPC ............. H04W 76/28; H04W 28/0289; H04W 28/0294; H04W 28/26; H04L 1/00; H04L 1/18; H04L 1/1812; H04L 1/1825; H04L 1/1887; H04L 5/00
  See application file for complete search history.

(56) References Cited

U.S. PATENT DOCUMENTS

| | | | |
|---|---|---|---|
| 2017/0048718 A1* | 2/2017 | Kim ................. | H04W 56/0005 |
| 2017/0126300 A1* | 5/2017 | Park .................... | H04B 7/0626 |
| 2017/0142751 A1* | 5/2017 | Liu ........................ | H04L 5/1415 |
| 2017/0325225 A1* | 11/2017 | Dinan ............... | H04W 72/0446 |
| 2018/0115981 A1* | 4/2018 | Kim .......................... | H04L 1/18 |
| 2018/0184475 A1* | 6/2018 | Babaei ................ | H04W 72/042 |
| 2018/0199376 A1* | 7/2018 | Kim .......................... | H04L 1/18 |
| 2018/0205526 A1* | 7/2018 | Kim .......................... | H04J 11/00 |
| 2018/0213386 A1* | 7/2018 | Kim .......................... | H04J 11/00 |
| 2018/0242360 A1* | 8/2018 | Noh ........................ | H04L 27/26 |
| 2018/0249484 A1* | 8/2018 | Kim ...................... | H04W 74/08 |

OTHER PUBLICATIONS

Interdigital Communications, "On design targets and supported functionality for LTE LAA", 3GPP TSG RAN WG1 Meeting #78bis, R1-144219, Oct. 2014, 6 pages.
Ericsson, "Discussion on LBT Protocols", 3GPP TSG RAN WG1 Meeting #80bis, R1-152326, Apr. 2015, 10 pages.
CMCC, "Further co-existence evaluation results for LAA", 3GPP TSG RAN WG1 Meeting #80bis, R1-152025, Apr. 2015, 10 pages.
Huawei, "Performance comparison of LBT categories", 3GPP TSG RAN WG1 Ad-hoc Meeting, R1-150977, Mar. 2015, 4 pages.
Huawei, "Co-existence results using LBT category 4 (LBE with variable contention window)", 3GPP TSG RAN WG1 Ad-hoc Meeting, R1-150975, Mar. 2015, 5 pages.
Alcatel-Lucent et al., "Evaluation results for LAA and Wi-Fi Coexistence with DL-Only LAA", 3GPP TSG RAN WG1 Meeting #81, R1-153384, May 2015, 6 pages.
Ericsson, "Discussion on LBT Protocols", 3GPP TSG RAN WG1 Meeting #80bis, R1-151996, Apr. 2015, 9 pages.
European Patent Office Application Serial No. 16793012.2, Search Report dated Dec. 10, 2018, 4 pages.
Huawei, et al., "Description of candidate LBT schemes" R1-150978, 3GPP TSG RAN WG1 Ad-hoc Meeting, Mar. 2015, 9 pages.
Ericsson, "Discussion on LBT Protocols", R1-152326, 3GPP TSG RAN WG1 Meeting #80bis, Apr. 2015, 10 pages.

* cited by examiner

FIG. 4
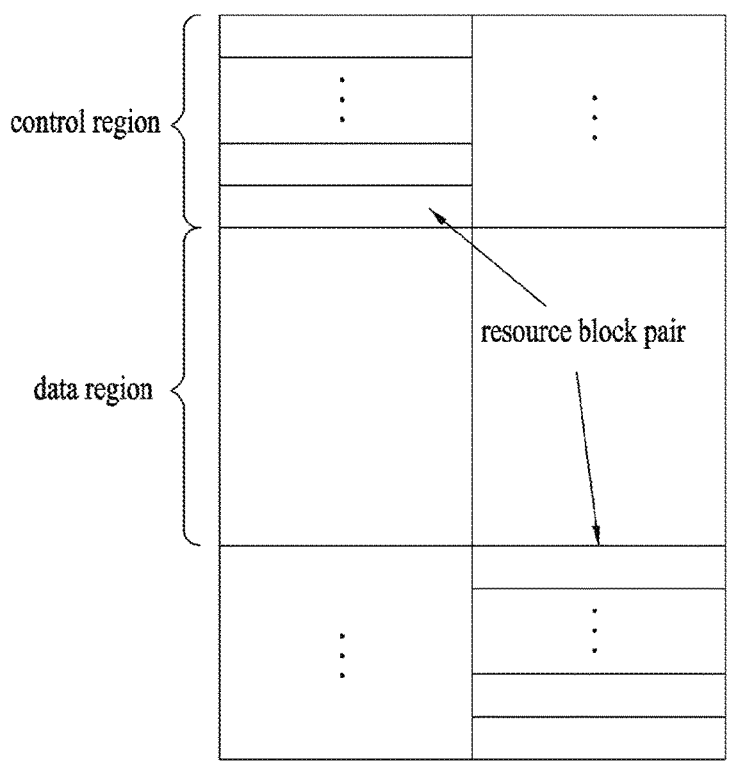
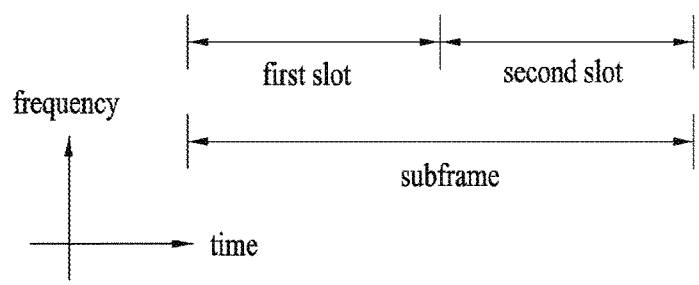

PUCCH format 1a and 1b structure (normal CP case)

PUCCH format 1a and 1b structure (extended CP case)

PUCCH format 2, 2a, and 2b structure (normal CP case)

PUCCH format 2, 2a, and 2b structure (extended CP case)

FIG. 10 resource allocation: 18 ACK/NACK channels in normal CP

| cell-specific cyclic shift offset | | RS orthogonal cover | | | ACK/NACK orthogonal cover shift | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | 13 | | 6 | 13 |
| 3 | 2 | 1 | 7 | 14 | 1 | 7 | 14 |
| 4 | 3 | | 8 | 15 | | 8 | 15 |
| 5 | 4 | 2 | 9 | 16 | 2 | 9 | 16 |
| 6 | 5 | | 10 | 17 | | 10 | 17 |
| 7 | 6 | 3 | 11 | | 3 | 11 | |
| 8 | 7 | | | | | | |
| 9 | 8 | 4 | | | 4 | | |
| 10 | 9 | | | | | | |
| 11 | 10 | 5 | | | 5 | | |
| 0 | 11 | | | | | | |

$\Delta_{shift}^{PUCCH} \in \{\{1,2,3\} \text{ normal CP case}, \{1,2,3\} \text{ extended CP case}\}$ $\delta_{offset}^{PUCCH} \in \{0,1,...,\Delta_{shift}^{PUCCH}-1\}$ specific cyclic shift offset $n_{OC}$    orthogonal sequence index for ACK/NACK
$\bar{n}_{OC}$    orthogonal sequence index for RS
$n_{CS}$    cyclic shift value of CAZAC sequence
n'    ACK/NACK resource index used for channelizing in RB FIG. 19
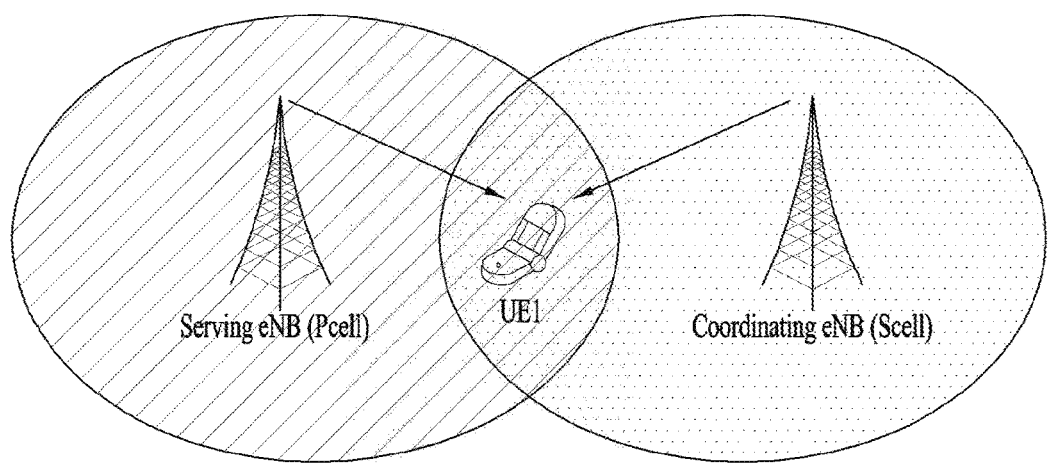
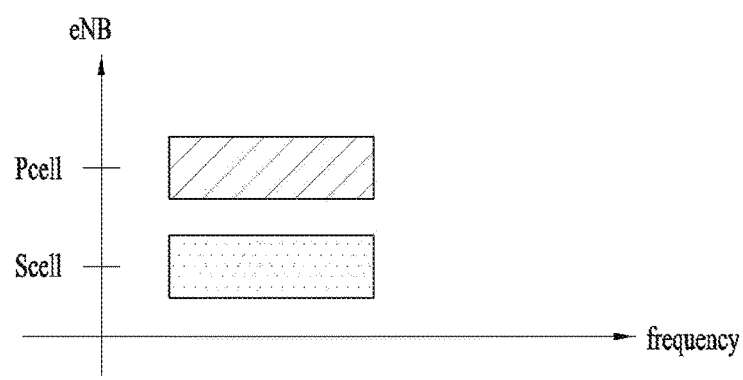

FIG. 25
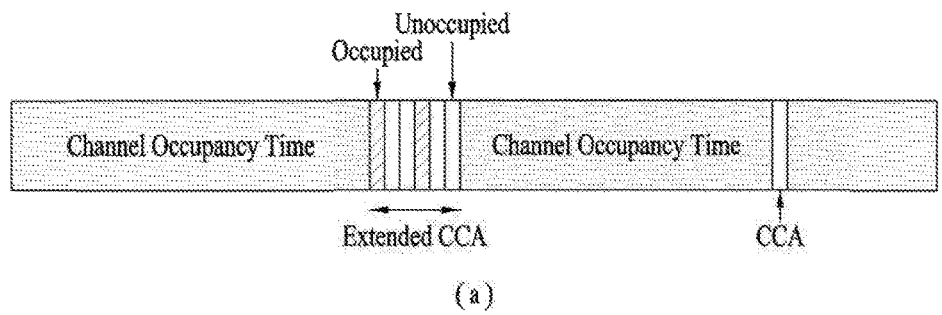
(a)
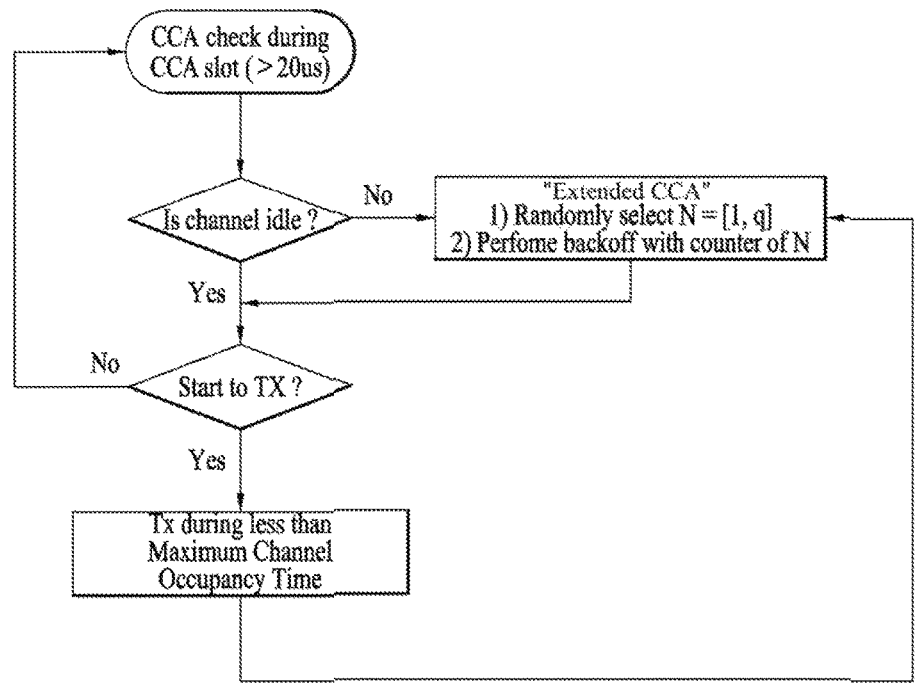
(b)

METHOD FOR ADJUSTING CONTENTION WINDOW SIZE ON BASIS OF HARQ-ACK INFORMATION IN WIRELESS ACCESS SYSTEM SUPPORTING UNLICENSED BAND, AND DEVICE FOR SUPPORTING SAME

CROSS-REFERENCE TO RELATED APPLICATIONS

This application is the National Stage filing under 35 U.S.C. 371 of International Application No. PCT/KR2016/005010, filed on May 12, 2016, which claims the benefit of U.S. Provisional Application No. 62/160,597, filed on May 12, 2015, 62/165,158, filed on May 21, 2015, 62/204,411, filed on Aug. 12, 2015, 62/207,901, filed on Aug. 20, 2015, 62/213,119, filed on Sep. 2, 2015, 62/216,996, filed on Sep. 10, 2015, 62/237,587, filed on Oct. 6, 2015, and 62/238,706, filed on Oct. 8, 2015, the contents of which are all hereby incorporated by reference herein in their entirety.

TECHNICAL FIELD

The present disclosure relates to a wireless access system supporting an unlicensed band, and more particularly, to various methods for adjusting a contention window size, various methods for determining a time point when to apply an adjusted contention window size, methods for distinguishing a collision from a channel error, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide a method for efficiently transmitting and receiving data in a wireless access system supporting an unlicensed band.

Another aspect of the present disclosure is to provide a method for efficiently performing a channel access procedure by adjusting a contention window size.

Another aspect of the present disclosure is to provide a time when an adjusted contention window is to be applied.

Another aspect of the present disclosure is to provide methods for distinguishing a collision from a channel error in an unlicensed band and transmitting a related feedback.

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting an unlicensed band, and more particularly, to various methods for adjusting a contention window size, methods for determining when to apply an adjusted contention window size, methods for distinguishing a collision from a channel error, and apparatuses supporting the same.

In an aspect of the present disclosure, a method for adjusting a contention window size (CWS) in a wireless access system supporting an unlicensed band may include performing a channel access procedure, transmitting a transmission burst including a downlink signal in the unlicensed band, if it is determined as a result of the channel access procedure that a serving cell (SCell) of the unlicensed band is an idle state, receiving hybrid automatic repeat and request acknowledgment (HARQ-ACK) information corresponding to the transmission burst, and adjusting the CWS based on the number of discontinuous transmission (DTX) states in the HARQ-ACK information, if the transmission burst is scheduled by a self-carrier scheduling.

In another aspect of the present disclosure, a transmission node configured to adjust a CWS in a wireless access system supporting an unlicensed band may include a transmitter, a receiver, and a processor for supporting CWS adjustment. The processor may be configured to perform a channel access procedure by controlling the transmitter and the receiver, to transmit a transmission burst including a downlink signal in the unlicensed band by controlling the transmitter, if it is determined as a result of the channel access procedure that a serving cell (SCell) of the unlicensed band is an idle state, to receive HARQ-ACK information corresponding to the transmission burst by controlling the receiver, and to adjust the CWS based on the number of DTX states in the HARQ-ACK information, if the transmission burst is scheduled by a self-carrier scheduling.

In the above aspects, in order to adjust the CWS, a DTX state is counted as a negative ACK (NACK) state. Herein, a NACK/DTX state or an ANY state in the HARQ-ACK information may also be counted as the NACK state.

In the above aspects, if the transmission burst is scheduled by cross-carrier scheduling, only a NACK state, not a DTX state in the HARQ-ACK information may be used for the CWS adjustment.

It is preferred that the HARQ-ACK information used for the CWS adjustment is HARQ-ACK information corresponding to a first subframe of the transmission burst.

The above-described aspects of the present disclosure are merely some parts of the embodiments of the present disclosure and various embodiments into which the technical features of the present disclosure are incorporated may be derived and understood by persons skilled in the art from the following detailed description of the present disclosure.

Advantageous Effects

Embodiments of the present disclosure have the following effects.

First, data may be transmitted and received efficiently in a wireless access system supporting an unlicensed band.

Secondly, a channel access procedure may be performed efficiently by adjusting a contention window size.

Thirdly, as a time when an adjusted contention size is to be applied is provided, an adjustment procedure may be performed efficiently.

Fourthly, as a feedback is transmitted by distinguishing a collision situation from a channel error situation in an unlicensed band, an evolved Node B (eNB) or a transmission node may use a different retransmission scheme according to a situation. Therefore, data may be transmitted reliably.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4 is a view illustrating an exemplary structure of an uplink subframe;

FIG. 10 is a view illustrating Acknowledgment/Negative Acknowledgment (ACK/NACK) channelization for PUCCH formats 1a an 1b;

FIG. 19 is a conceptual view illustrating a Coordinated Multi-Point (CoMP) system operating in a CA environment;

FIG. 25 is a view illustrating an exemplary Load Based Equipment (LBE) operation as one of the LBT operations;

BEST MODE FOR CARRYING OUT THE INVENTION

Figure 1:
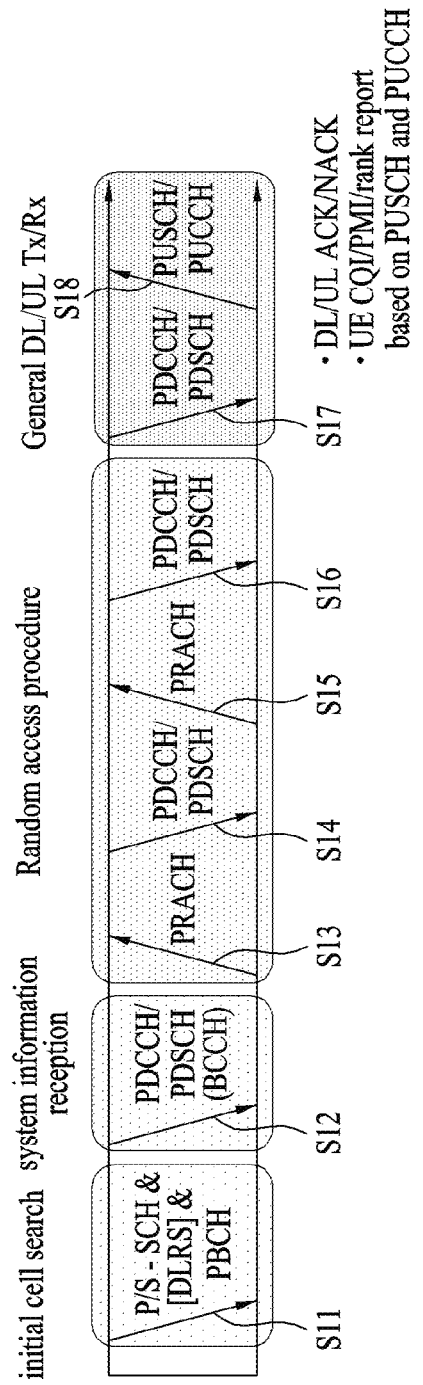
FIG. 1 is a view illustrating physical channels and a signal transmission method using the physical channels.

Embodiments of the present disclosure as described below in detail relate to a wireless access system supporting an unlicensed band, and propose methods for controlling uplink power and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term Transmission Opportunity Period (TxOP) is interchangeable with transmission period, Transmission (Tx) burst, or Reserved Resource Period (RRP). Further, a Listen Before Talk (LBT) operation may be performed for the same purpose as that of carrier sensing for determining whether a channel is in an idle state, Clear Channel Assessment (CCA), and a Channel Access Procedure (CAP).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
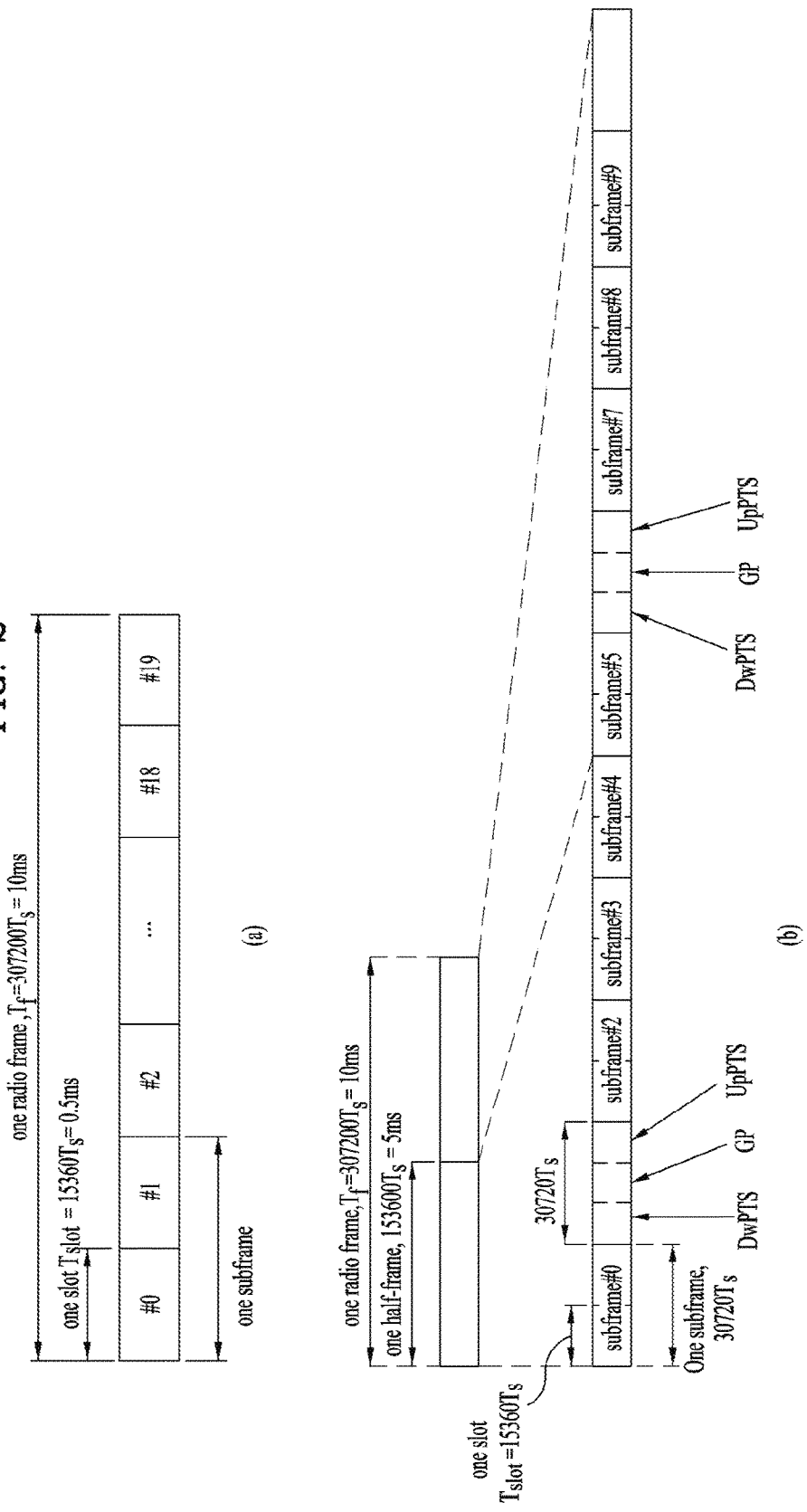
FIG. 2 is a view illustrating exemplary radio frame structures.

FIG. 2 illustrates exemplary radio frame structures used in embodiments of the present disclosure.

FIG. 2($a$) illustrates frame structure type 1. Frame structure type 1 is applicable to both a full Frequency Division Duplex (FDD) system and a half FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

Figure 3:
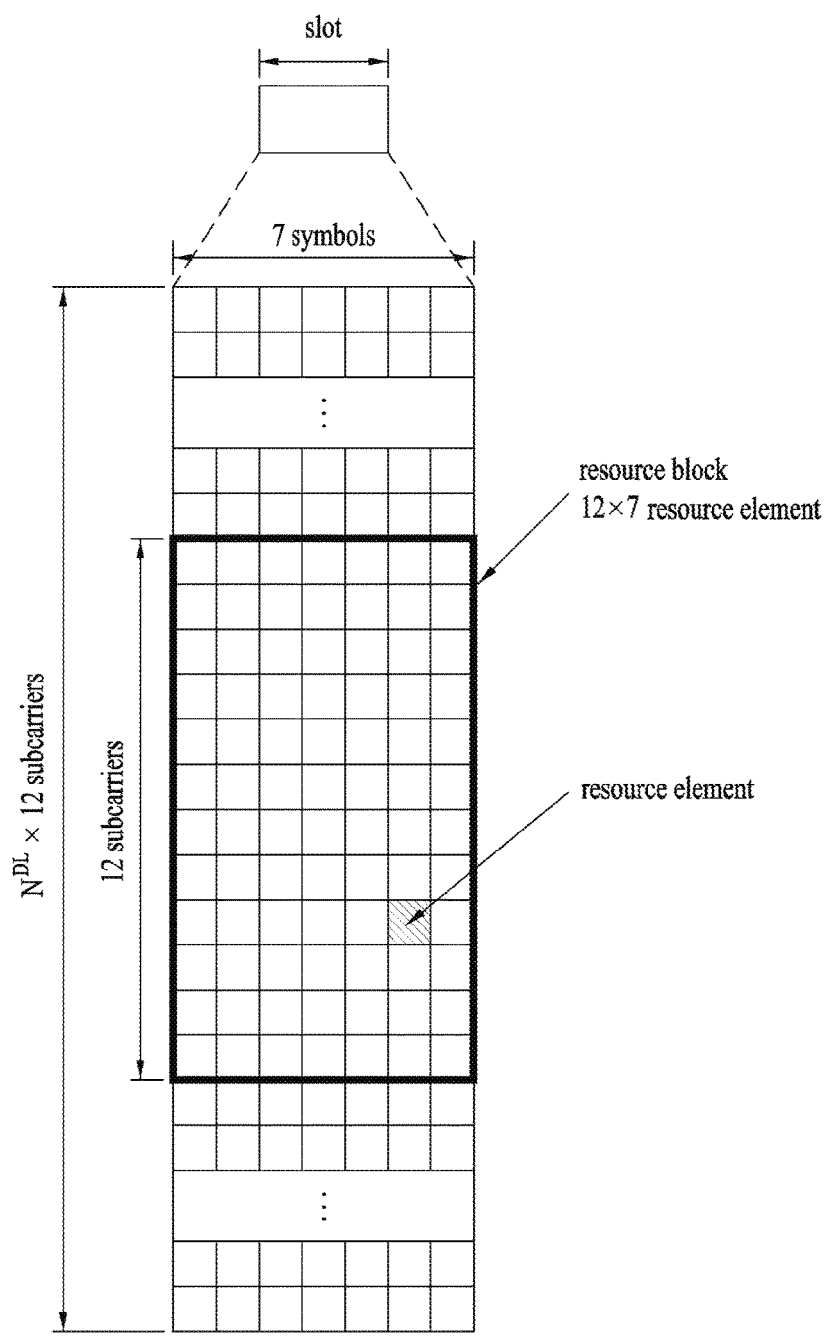
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
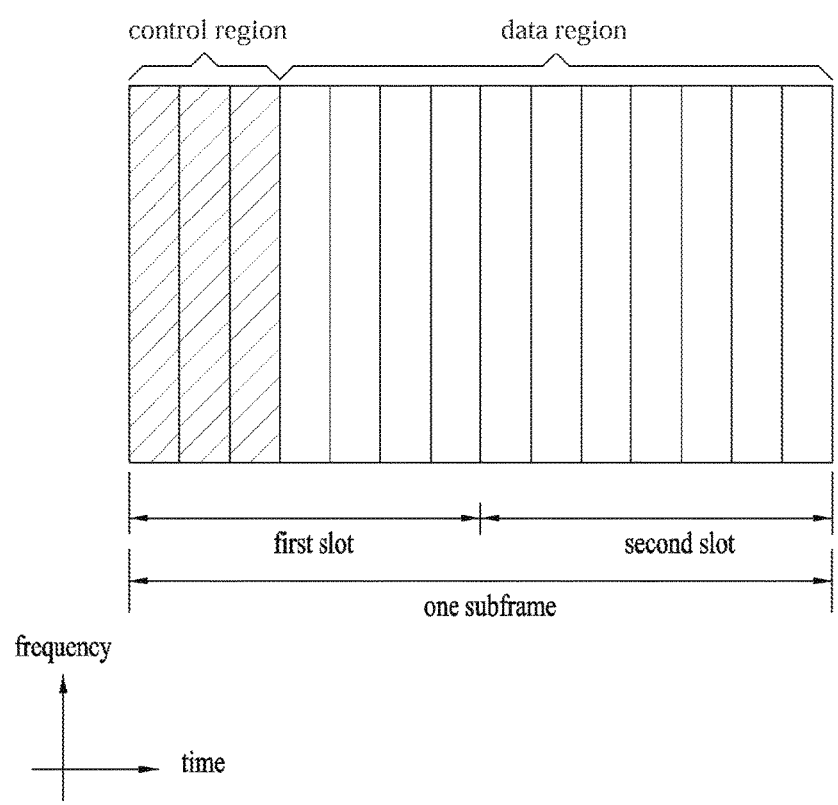
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)
1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
  1) Format 1a: BPSK ACK/NACK for 1 codeword
  2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment

[Table 6] shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| | SC-FDMA symbol location of RS | |
|---|---|---|
| PUCCH format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
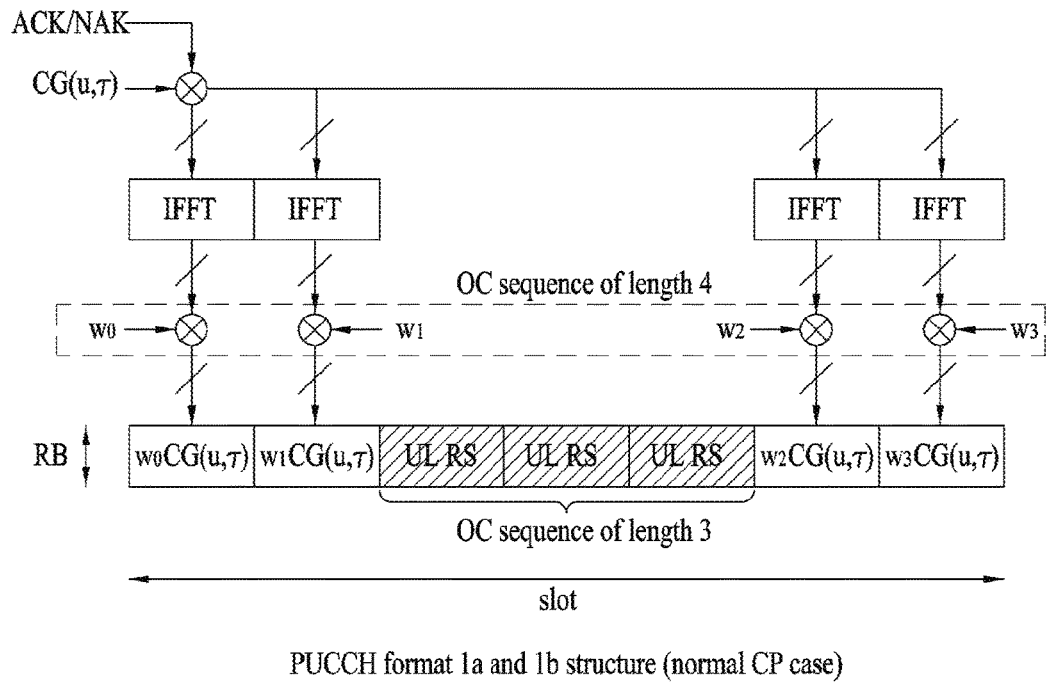
FIG. 6 is a view illustrating Physical Uplink Control Channel (PUCCH) formats 1a and 1b in a normal Cyclic Prefix (CP) case.
Figure 7:
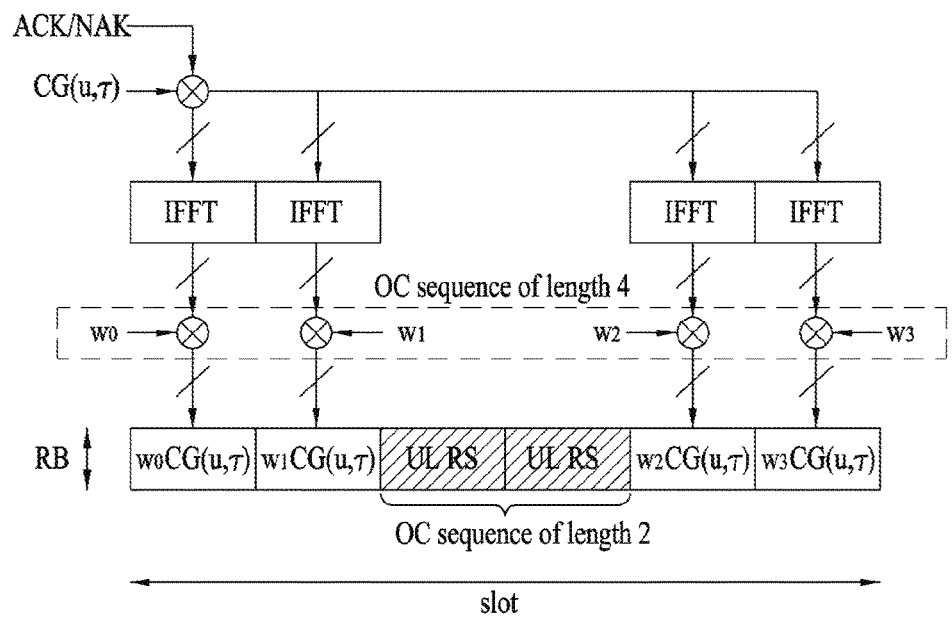
FIG. 7 is a view illustrating PUCCH formats 1a and 1b in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each UE, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18

UEs may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a UE through RRC (radio resource control. For non-persistent scheduling with dynamic ACK/NACK, the ACK/NACK resource may be implicitly allocated to a UE using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}$ ($n_s$) | Orthogonal sequences $[w(0) \ldots w(N_{SF}^{PUCCH} - 1]$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences $[w(0) \ldots w(N_{SF}^{PUCCH} - 1]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\overline{w}(0) \ldots \overline{w}(N_{RS}^{PUCCH}-1)]$ for a reference signal in PUCCH format 1/1a/1b is shown in Table 11.

TABLE 11

| Sequence index $\overline{n}_{oc}$ ($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
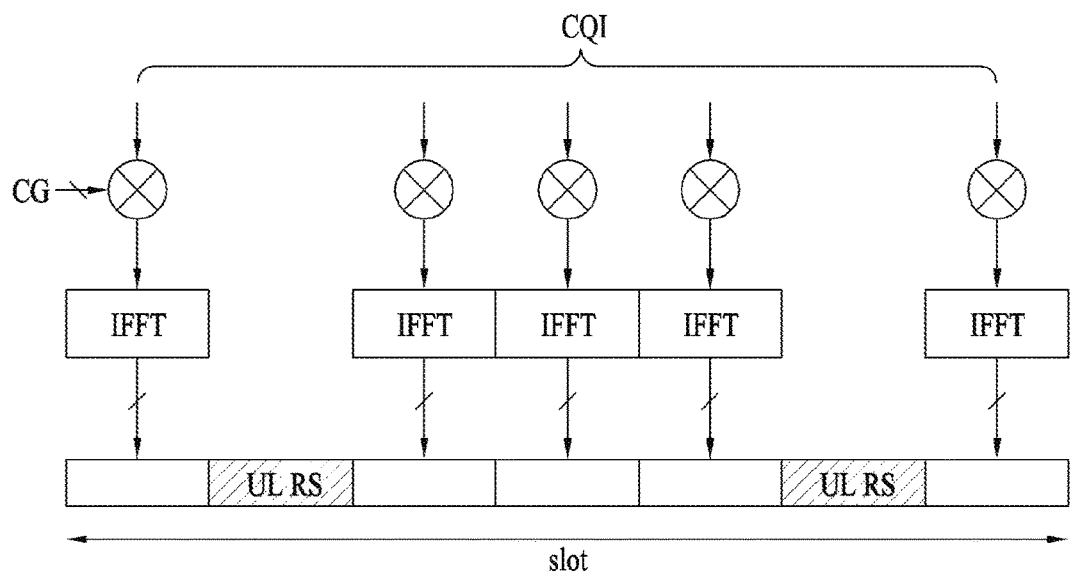
FIG. 8 is a view illustrating PUCCH format 2/2a/2b in the normal CP case.

FIG. 8 shows PUCCH format 2/2a/2b in case of a normal cyclic prefix. And, FIG. 9 shows PUCCH format 2/2a/2b in case of an extended cyclic prefix.

Figure 9:
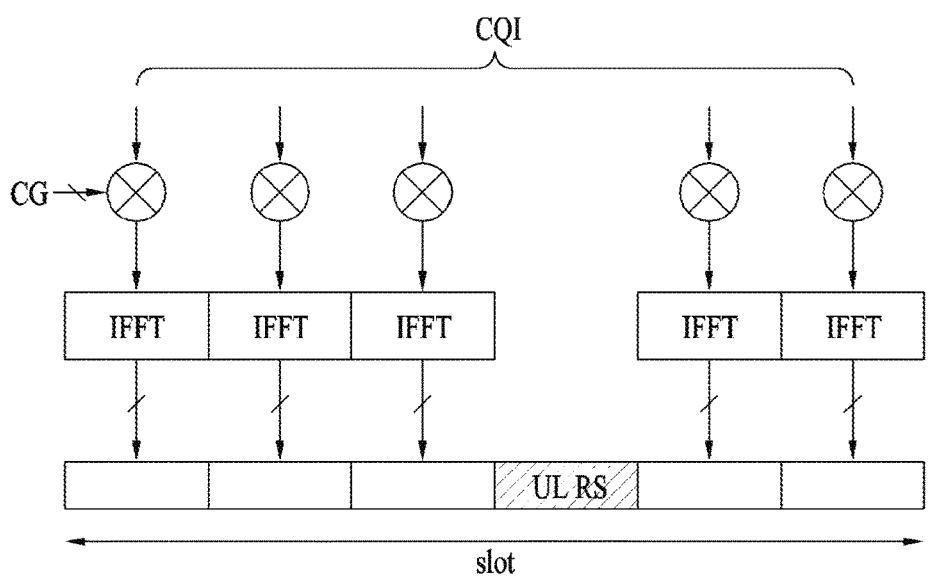
FIG. 9 is a view illustrating PUCCH format 2/2a/2b in the extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of '$\Delta_{shift}^{PUCCH}=2$'

Figure 11:
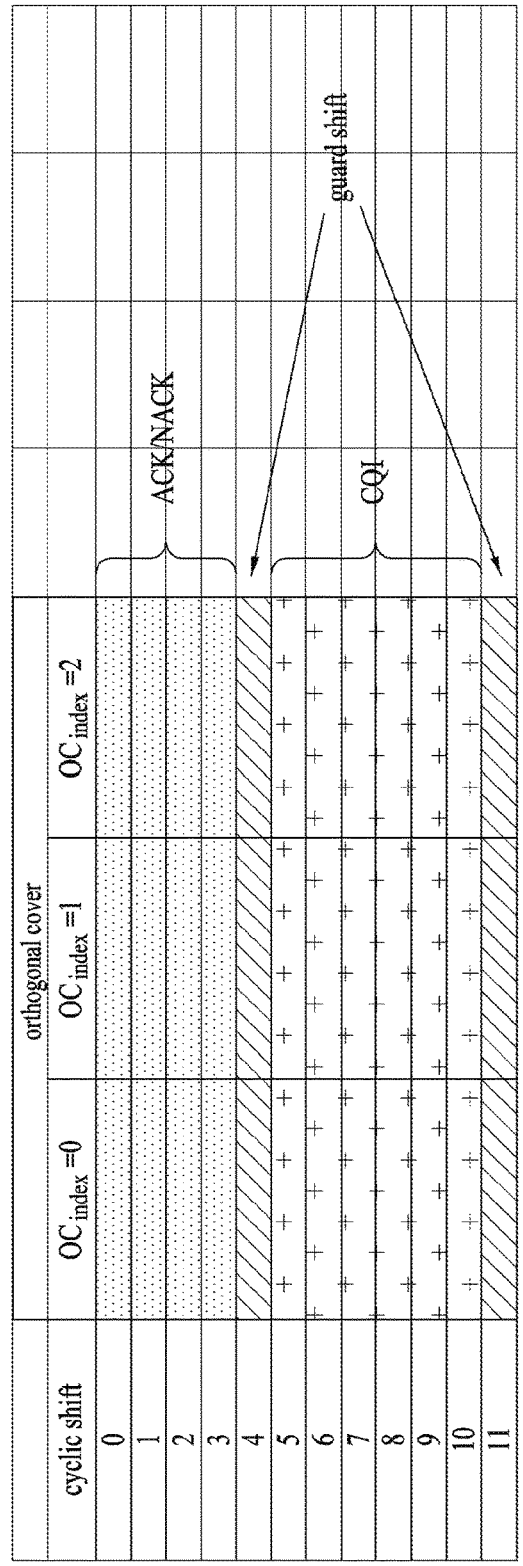
FIG. 11 is a view illustrating channelization for a hybrid structure of PUCCH format 1a/1b and PUCCH format 2/2a/2b in the same Physical Resource Block (PRB)

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner (1) Symbol-based cell-specific CS hopping for randomization of inter-cell interference (2) Slot level CS/OC remapping
 1) For inter-cell interference randomization
 2) Slot based access for mapping between ACK/NACK channel and resource (k)

Meanwhile, resource $n_r$ for PUCCH format 1/1a/1b may include the following combinations.

(1) CS (=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots, a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by [Equation 31].

$$b_i = \sum_{n=0}^{A-1} (a_n \cdot M_{i,n}) \bmod 2 \qquad \text{[Equation 3]}$$

In [Equation 3], 'i=0, 1, 2, ..., B−1' is met.

In case of wideband repots, a bandwidth of UCI (uplink control information) field for CQI/PMI can be represented as Tables 8 to 10 in the following.

[Table 13] shows UCI (Uplink Control Information) field for broadband report (single antenna port, transmit diversity) or open loop spatial multiplexing PDSCH CQI feedback.

TABLE 13

| Field | Bandwidth |
|---|---|
| Wideband CQI | 4 |

[Table 14] shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
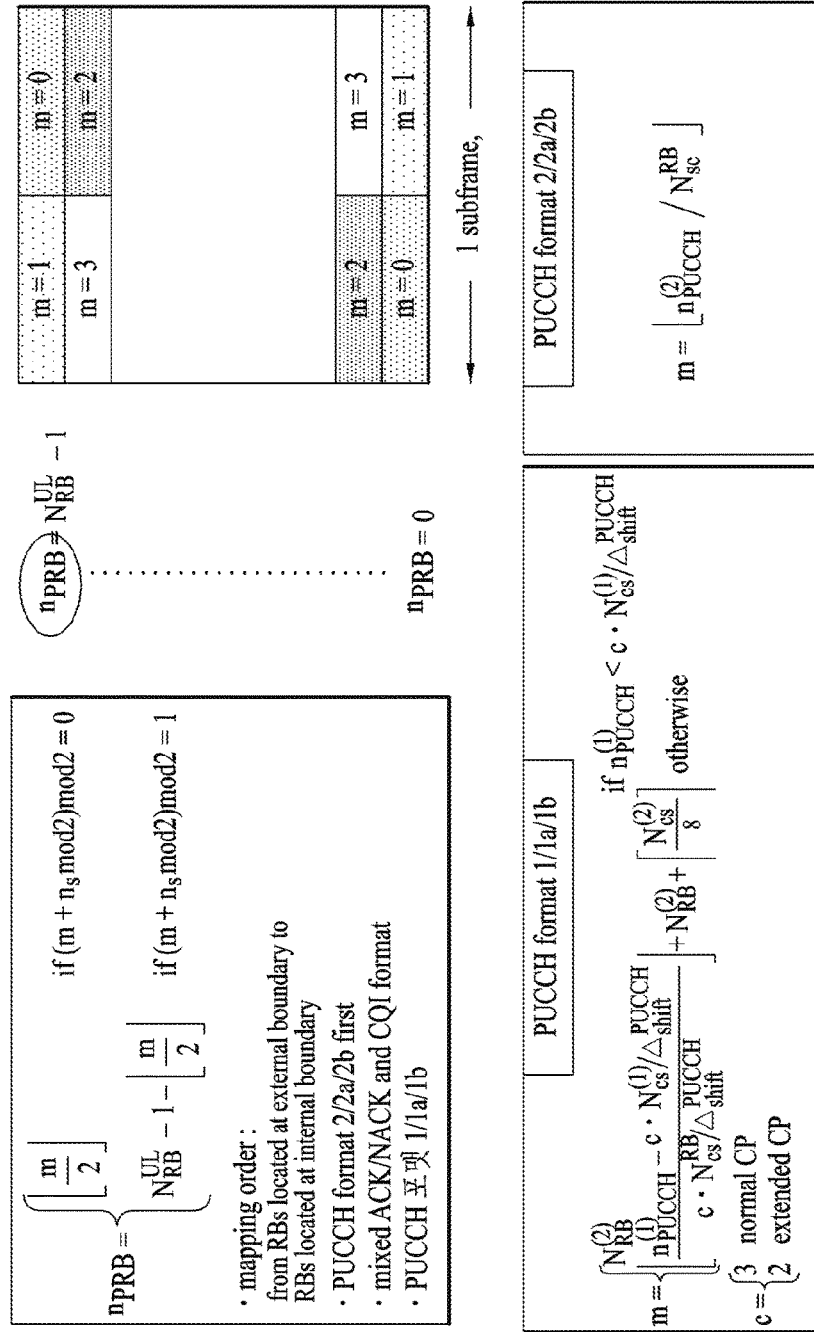
FIG. 12 is a view illustrating a PRB allocation method.
Figure 20:
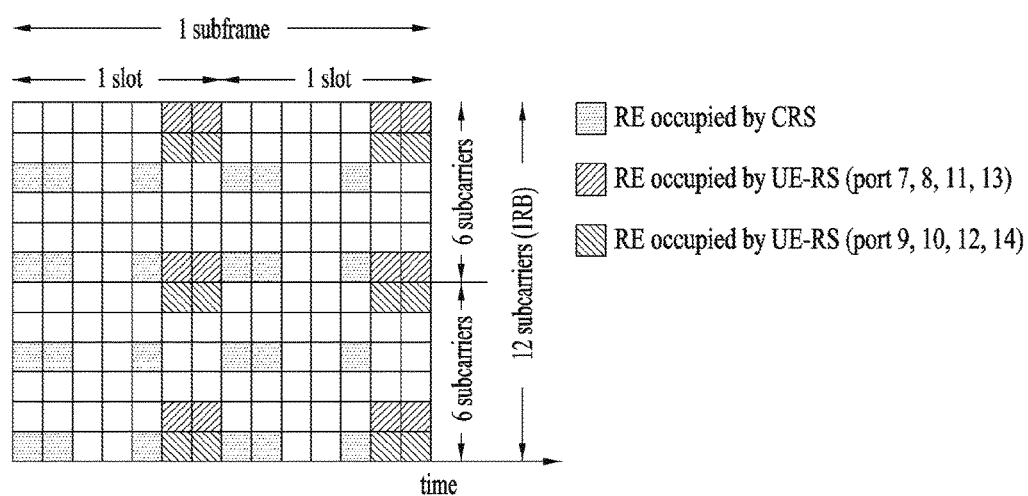
FIG. 20 is a view illustrating an exemplary subframe to which User Equipment (UE)-specific Reference Signals (RSs) (UE-RSs) are allocated, which may be used in embodiments of the present disclosure.

FIG. 12 is a diagram for PRB allocation. Referring to FIG. 20, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
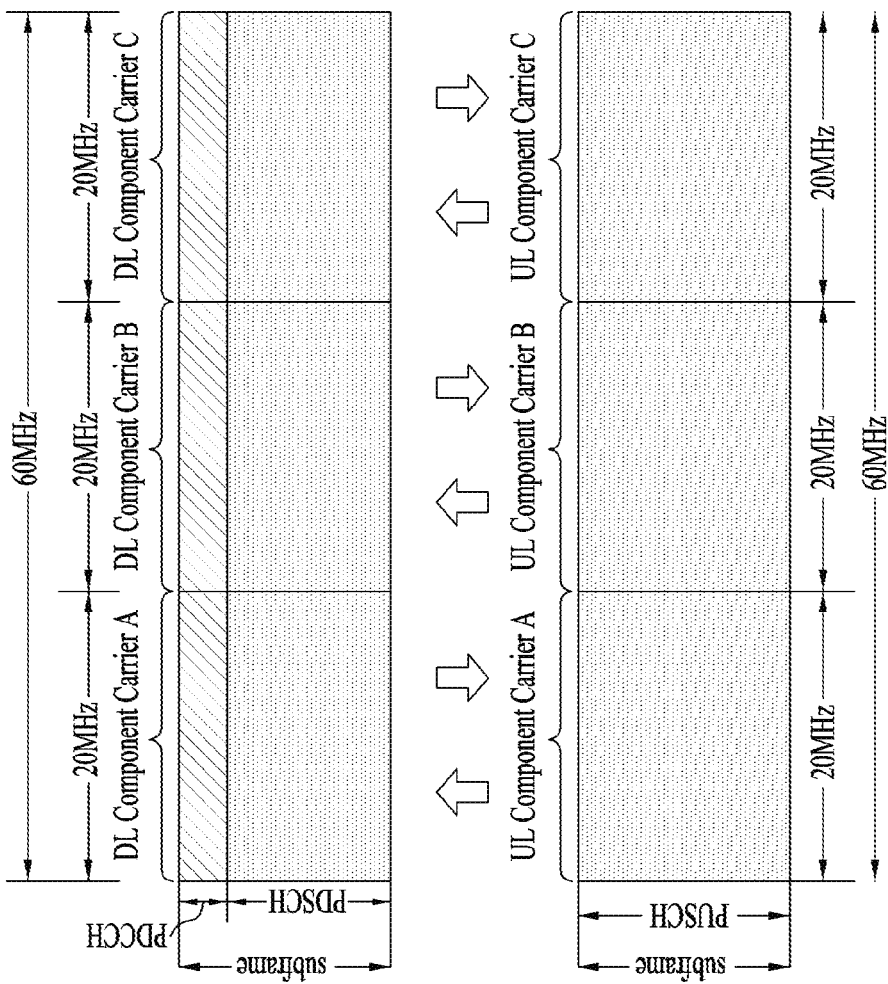
FIG. 13 is a view illustrating exemplary Component Carriers (CCs) and exemplary Carrier Aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
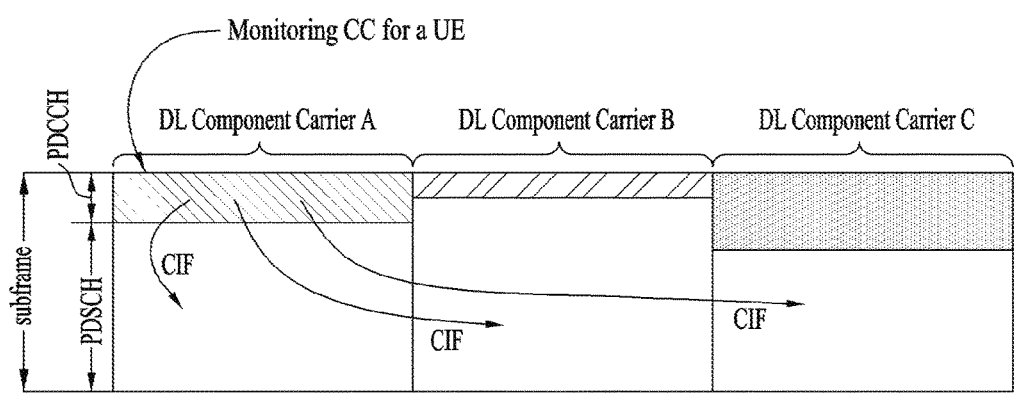
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
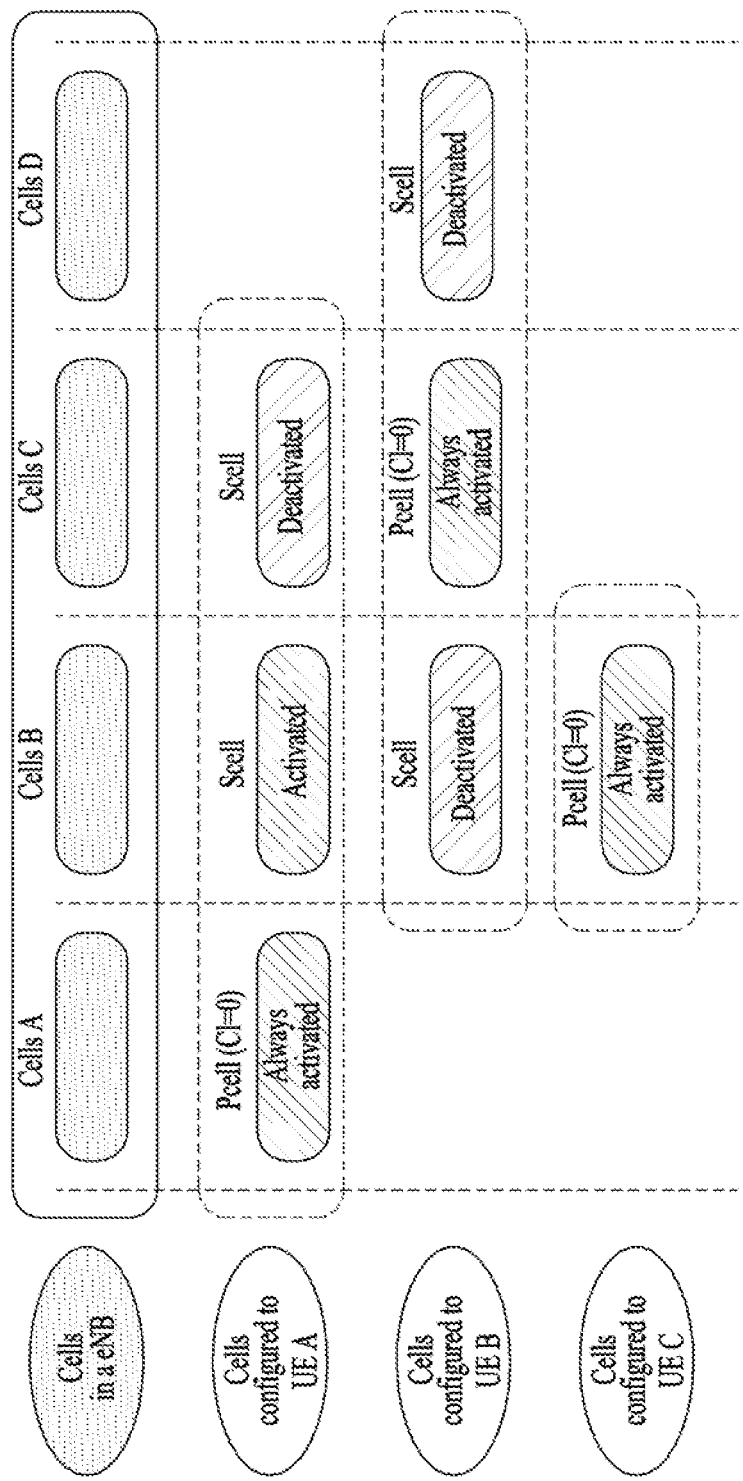
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3. Channel State Information (CSI) Feedback on PUCCH

First of all, in the 3GPP LTE system, when a DL reception entity (e.g., UE) is connected to a DL transmission entity (e.g., BS), the DL reception entity performs measurement on a Reference Signal Received Power (RSRP) of a reference signal transmitted in DL, a quality of a reference signal (RSRQ: Reference Signal Received Quality) and the like at a random time and is then able to make a periodic or even-triggered report of a corresponding measurement result to the BS.

Each UE reports a DL channel information in accordance with a DL channel status via uplink. A base station is then able to determine time/frequency resources, MCS (modulation and coding scheme) and the like appropriate for a data transmission to each UE using the DL channel information received from the each UE.

Such Channel State Information (CSI) may include Channel Quality Indicator (CQI), Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a BS.

In case of the aperiodic report, it is set for each UE by a 1-bit request bit (CQI request bit) contained in UL scheduling information downloaded to a UE by a BS. Having received this information, each UE is then able to deliver channel information to the BS via a Physical Uplink Shared Channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a BS via a Physical Uplink Control Channel (PUCCH) in accordance with a determined period. In case that data transmitted in uplink simultaneously exists in a subframe in which channel information is transmitted by a determined period, the corresponding channel information may be transmitted together with the data not on the PUCCH but on a Physical Uplink Shared Channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into WideBand (WB) CQI and SubBand (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a 1$^{st}$ codeword can be transmitted.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1$^{st}$ codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each Bandwidth Part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.
1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

2.4 Method for Transmitting ACK/NACK on PUCCH 2.4.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the Transmission (Tx) node can identify the ACK/NACK result based on the transmission position of the PUCCH signal and the bits of the ACK/NACK signal as shown in [Table 17] below.

TABLE 17

| HARQ-ACK(0), HARQ-ACK(1),<br>HARQ-ACK(2), HARQ-ACK(3) | $n_{PUCCH}^{(1)}$ | b(0), b(1) |
|---|---|---|
| ACK, ACK, ACK, ACK | $n_{PUCCH, 1}^{(1)}$ | 1, 1 |
| ACK, ACK, ACK, NACK/DTX | $n_{PUCCH, 1}^{(1)}$ | 1, 0 |
| NACK/DTX, NACK/DTX, NACK, DTX | $n_{PUCCH, 2}^{(1)}$ | 1, 1 |
| ACK, ACK, NACK/DTX, ACK | $n_{PUCCH, 1}^{(1)}$ | 1, 0 |
| NACK, DTX, DTX, DTX | $n_{PUCCH, 0}^{(1)}$ | 1, 0 |
| ACK, ACK, NACK/DTX, NACK/DTX | $n_{PUCCH, 1}^{(1)}$ | 1, 0 |

TABLE 17-continued

| HARQ-ACK(0), HARQ-ACK(1), HARQ-ACK(2), HARQ-ACK(3) | $n_{PUCCH}^{(1)}$ | b(0), b(1) |
|---|---|---|
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In [Table 17], HARQ-ACK(i) indicates the ACK/NACK result for the data unit i. For example, if a maximum of 4 data units is transmitted, i=0, 1, 2, 3. In Table 17, DTX means that there is no data unit transmitted for corresponding HARQ-ACK(i) or the Reception (Rx) node doesn't detect the existence of the data unit corresponding to HARQ-ACK(i).

In addition, $n_{PUCCH,X}^{(1)}$ indicates the PUCCH resource which should be used in actual ACK/NACK transmission, if there are 4 PUCCH resources, a maximum of four PUCCH resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0), b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(0) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In ACK/NACK multiplexing method (see Table 17), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

2.4.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 16:
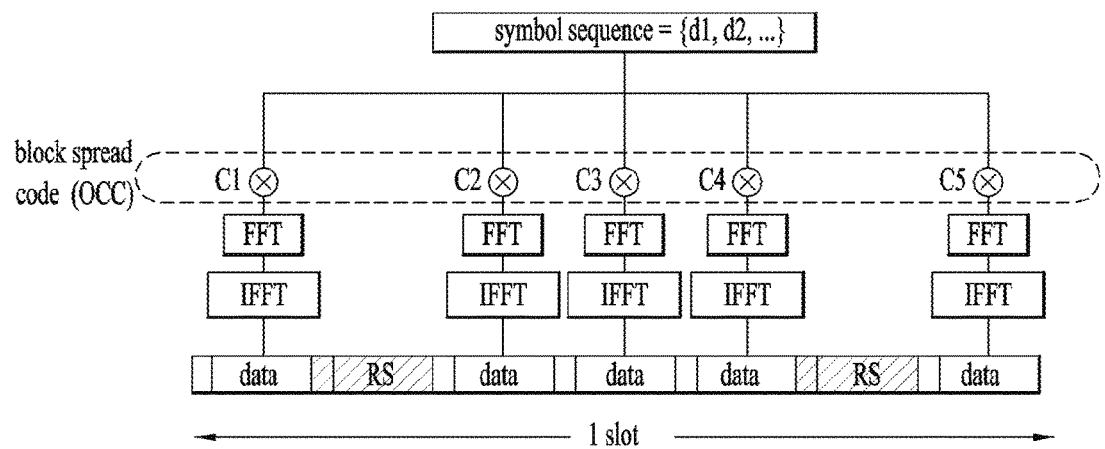
FIG. 16 is a view illustrating an exemplary new PUCCH format based on block spreading.

FIG. 16 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an Orthogonal Cover Code (OCC) as shown in FIG. 16. That is, the symbol sequence is spread using the OCC to multiplex control signals of several UEs in the same RB.

In the above-described PUCCH format 2, one symbol sequence is transmitted over the time domain and UE multiplexing is performed using Cyclic Shift (CCS) of a CAZAC sequence. However, in the new PUCCH format based on block spreading, one symbol sequence is transmitted over the frequency domain and UE multiplexing is performed using time-domain spreading based on an OCC.

For example, as shown in FIG. 16, one symbol sequence may be generated as five SC-FDMA symbols by an OCC of length-5 (that is, SF=5). Although a total of 2 RS symbols is used during one slot in FIG. 16, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present invention, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two CodeWords (CW), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 Procedure for Transmitting and Receiving PUCCH

In a mobile communication system, one eNB transmits and receives data to and from a plurality of UEs via a wireless channel environment in one cell/sector. In a system operating using multiple carriers or the like, the eNB receives packet traffic from a wired Internet network and transmits the received packet traffic to each UE using a predetermined communication scheme. At this time, downlink scheduling is how the eNB determines when data is transmitted to which UE using which frequency domain. In addition, the eNB receives and demodulates data from the UE using a predetermined communication scheme and transmits packet traffic over a wired Internet network. Uplink scheduling is how the eNB determines when to enable which UE to transmit uplink data using which frequency domain. In general, a UE having a good channel state may transmit and receive data using more time and frequency resources.

Figure 17:
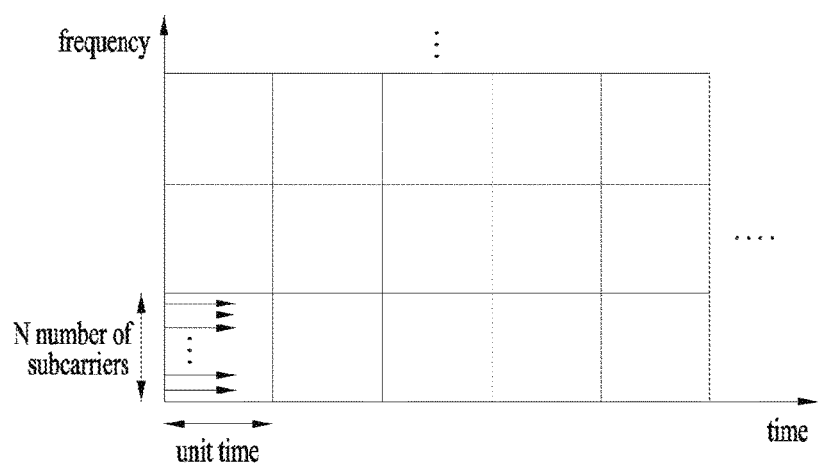
FIG. 17 is a view illustrating an exemplary configuration of a Resource Unit (RB) with time-frequency units.

In a system operating using multiple carriers or the like, resources may be roughly divided into a time domain and a frequency domain. The resources may be defined as resource blocks, which includes N subcarriers and M subframes or predetermined time units. At this time, N and M may be 1. FIG. 17 is a diagram showing an example of configuring a resource block in time-frequency units.

In FIG. 17, one rectangle means one resource block and one resource block has several subcarriers on one axis and has a predetermined time unit (e.g., slots or subframes) on the other axis.

In downlink, an eNB schedules one or more resource blocks to a UE selected according to a determined scheduling rule and transmits data using resource bocks allocated to the UE. In uplink, the eNB schedules one or more resource blocks to a UE selected according to a predetermined scheduling rule and a UE transmits data in uplink using the allocated resources.

An error control method performed when a (sub)frame, in which data is transmitted and received, is lost or damaged after transmitting and receiving data after scheduling includes an Automatic Repeat reQuest (ARQ) method and a Hybrid ARQ (HARQ) method.

In the ARQ method, fundamentally, a transmitter waits for an acknowledgement (ACK) message after transmitting one (sub)frame and a receiver sends the ACK only upon receiving the sub(frame). When an error occurs in the (sub)frame, a negative ACK (NAK) message is sent and information on a reception frame, in which an error occurs, is removed from a receiver buffer. The transmitter transmits a subsequent (sub)frame upon receiving the ACK message but retransmits the (sub)frame upon receiving the NAK message. Unlike the ARQ method, in the HARQ method, when the received frame cannot be demodulated, the receiver transmits the NAK message to the transmitter, but the received frame is stored in a buffer during a predetermined time and is combined with a retransmitted frame, thereby increasing a reception success rate.

Recently, a HARQ method more efficient than the ARQ method is widely used. The HARQ method may be divided into various methods. For example, the HARQ method may be divided into a synchronous HARQ method and an asynchronous HARQ method according to retransmission timing and into a channel-adaptive HARQ method and a channel-non-adaptive HARQ method depending on whether the amount of resources used for retransmission is influenced by a channel state.

The synchronous HARQ method refers to a method of performing subsequent retransmission at timing determined by a system when initial transmission fails. For example, if it is assumed that retransmission is performed every four time units after initial transmission fails, retransmission timing is predetermined between the eNB and the UE and is not signaled. However, when the data transmission side receives a NAK message, the frame is retransmitted every four time units until an ACK message is received.

Meanwhile, the asynchronous HARQ method may be performed by newly scheduling retransmission timing or via additional signaling. The retransmission timing of the previously failed frame may be changed by several factors such as channel state.

The channel-non-adaptive HARQ method refers to a method of using scheduling information (e.g., the modulation method of the frame, the number of used resource blocks, Adaptive Modulation and Coding (AMC), etc.), which is set upon initial transmission, upon retransmission. In contrast, the channel-adaptive HARQ method refers to a method of changing such scheduling information according to the channel state.

For example, in the channel-non-adaptive HARQ method, a transmission side transmits data using six resource blocks upon initial transmission and retransmits data using six resource blocks upon retransmission. In contrast, in the channel-adaptive HARQ method, initial transmission is performed using six resource blocks and retransmission is performed using greater or less than six resource blocks according to the channel state.

Although there are four HARQ methods, the asynchronous and channel-adaptive HARQ method and the synchronous and channel-non-adaptive HARQ method are mainly used. The asynchronous and channel-adaptive HARQ method may maximize retransmission efficiency by adaptively changing the retransmission timing and the amount of used resources according to the channel state but may increase overhead. Accordingly, the asynchronous and channel-adaptive HARQ method is not generally considered for uplink. In contrast, the synchronous and channel-non-adaptive HARQ method may not cause overhead because retransmission timing and resource allocation are predetermined in the system, but has very low retransmission efficiency in a considerably changed channel state.

To this end, in the current 3GPP LTE/LTE-A system, the asynchronous HARQ method is used in downlink and the synchronous HARQ method is used in uplink.

Figure 18:
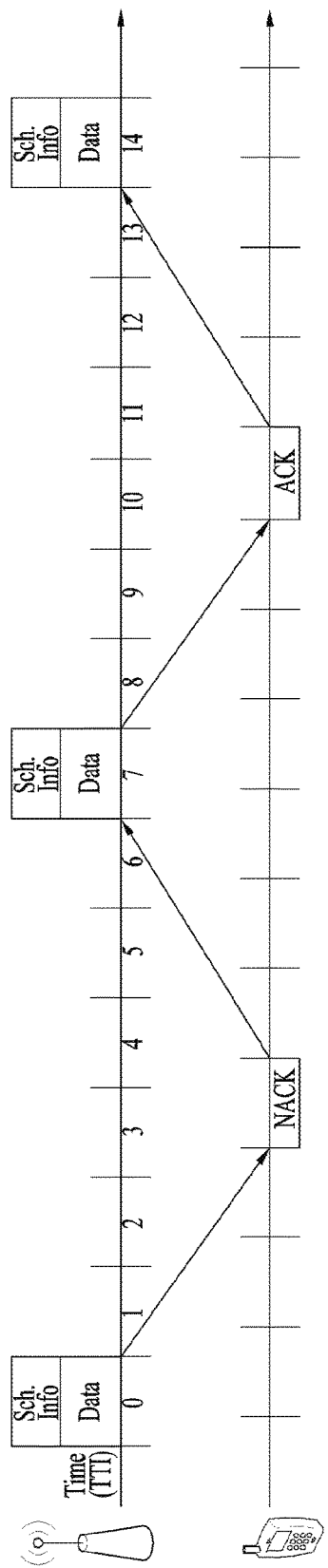
FIG. 18 is a view illustrating an exemplary method for resource allocation and retransmission in asynchronous Hybrid Automatic Repeat reQuest (HARQ)

FIG. 18 is a diagram showing an example of a resource allocation and retransmission method of an asynchronous HARQ method.

When an eNB transmits scheduling information in downlink, receives ACK/NAK information from a UE, and transmits next data, time delay occurs as shown in FIG. 19. This is channel propagation delay and delay occurring due to a time required for data decoding and data encoding.

A method of performing transmission using an independent HARQ process for data transmission without a gap during a delay period is being used. For example, if a shortest period from first data transmission to next data transmission is 7 subframes, data may be transmitted without a gap by setting 7 independent HARQ processes. In an LTE/LTE-A system, a maximum of eight HARQ processes may be allocated to one UE in non-MIMO.

2.6 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 19 is a conceptual view illustrating a CoMP system operating based on a CA environment.

In FIG. 19, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 19 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.7 Reference Signal (RS)

Now, a description will be given of RSs which may be used in embodiments of the present disclosure.

FIG. 20 illustrates an example of a subframe to which UE-RSs are allocated, which may be used in embodiments of the present disclosure.

Referring to FIG. 20, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 19, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.8 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 21:
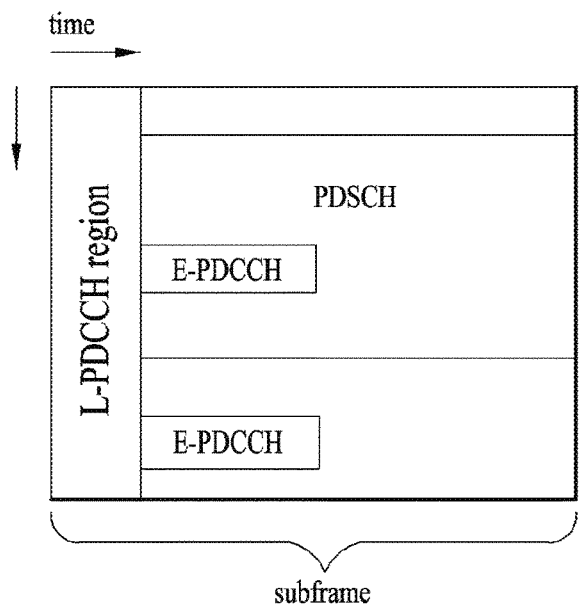
FIG. 21 is a view illustrating an exemplary multiplexing of a legacy Physical Downlink Channel (PDCCH), a Physical Downlink Shared Channel (PDSCH), and an Enhanced PDCCH (E-PDCCH) in the LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 21 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 22:
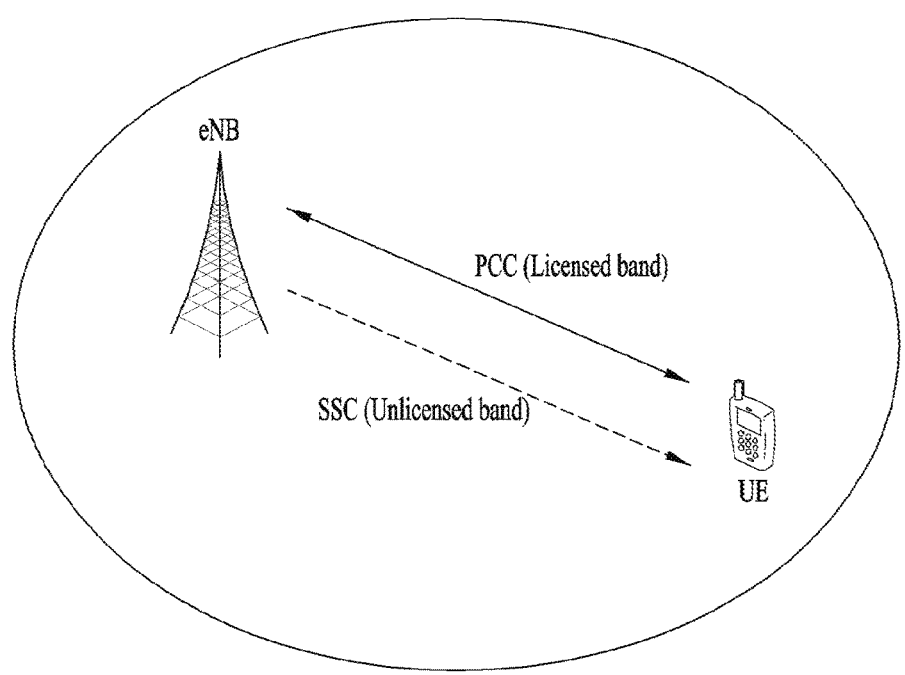
FIG. 22 is a view illustrating an exemplary CA environment supported in an LTE-Unlicensed (LTE-U) system.

FIG. 22 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 22, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 22 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 23:
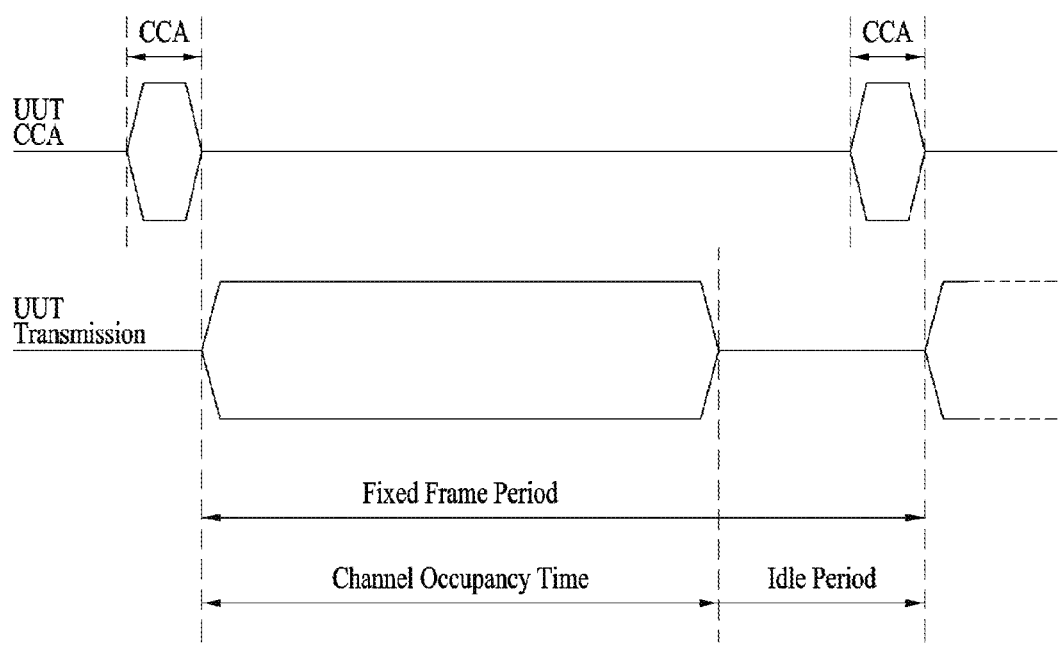
FIG. 23 is a view illustrating an exemplary Frame Based Equipment (FBE) operation as one of Listen-Before-Talk (LBT) operations.

FIG. 23 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 24:
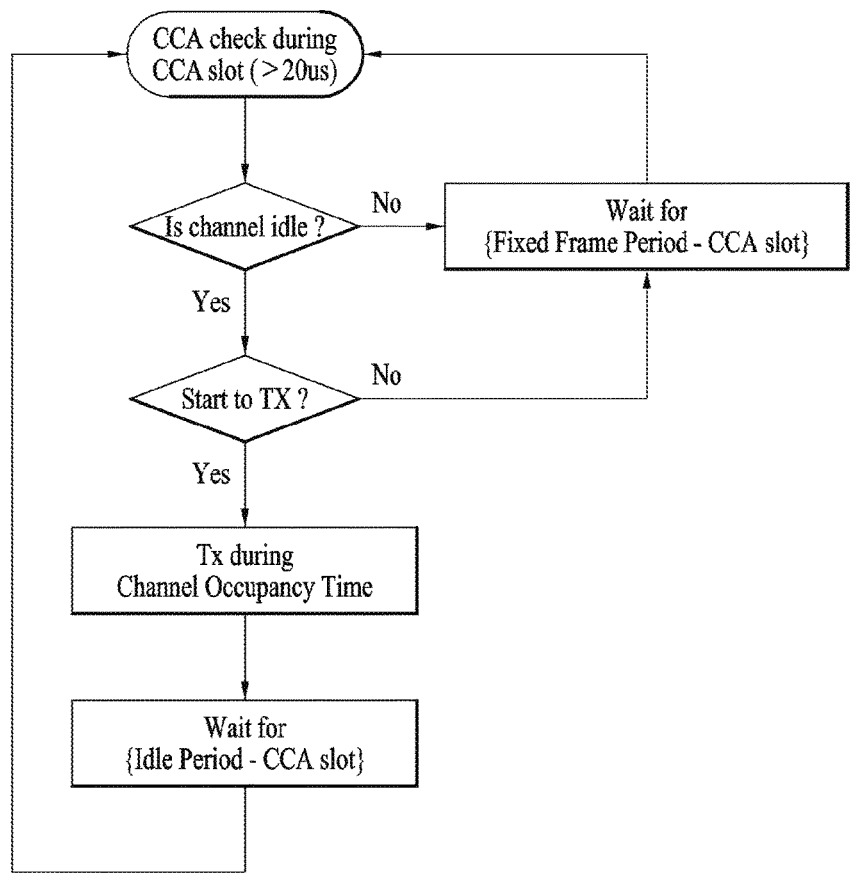
FIG. 24 is a block diagram illustrating the FBE operation.

FIG. 24 is a block diagram illustrating the FBE operation.

Referring to FIG. 24, a communication node (i.e., eNB) managing an SCell performs CCA during a CCA slot. If the channel is idle, the communication node performs data Transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 25 is a view illustrating an exemplary LBE operation as one of the LBT operations.

Referring to FIG. 25(a), in LBE, the communication node first sets q (q∈{4, 5, . . . , 32}) and then performs CCA during one CCA slot.

FIG. 25(b) is a block diagram illustrating the LBE operation. The LBE operation will be described with reference to FIG. 15(b).

The communication node may perform CCA during a CCA slot. If the channel is unoccupied in a first CCA slot, the communication node may transmit data by securing a time period of up to ($13/32$)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to $(13/32)$q ms.

4. Method for Updating Contention Window Size (CWS)

The afore-described Section 1 to Section 3 are applicable to embodiments of the present disclosure as described below. For example, operations, functions, and terms which are not defined in the embodiments may be executed and described based on Section 1 to Section 3.

A WiFi system operating in an unlicensed band uses a binary exponential backoff algorithm in order to avoid collision between nodes. In embodiments of the present disclosure, a range from which an eNB and/or a UE draws a backoff count is called a Contention Window (CW). If a minimum value CWmin and a maximum value CWmax are defined for a Contention Window Size (CWS), a transmission node first selects a random integer (e.g., 3) between 0 and CWmin−1. The transmission node performs CCA (CS, LBT, or the like). If the CCA result reveals that the number of slots determined to be idle on a corresponding channel is 3, the transmission node may start a transmission.

If the transmission node fails to receive an ACK for the transmission, the transmission node determines that collision has occurred, and doubles the CWS to decrease a collision probability. Accordingly, when the transmission node attempts a transmission again, the transmission node selects an integer between 0 and CWmin*2−1 and attempts as much backoff as the selected integer. If the transmission node fails in receiving an ACK again, the transmission node doubles the CWS again, and thus attempts a backoff by selecting an integer between 0 and CWmin*4−1. If CWmax is less than CWmin*4−1, the transmission node selects an integer between 0 and CWmax.

An LTE transmission node operating in the unlicensed band may also use the backoff algorithm in which a random integer is selected, and if as many idle SubFrames (SFs) or slots as the integer exist, a transmission is attempted. In this case, the LTE transmission node and the WiFi node may attempt transmissions simultaneously in the unlicensed band, and collide with each other. Since due to the collision, the WiFi node doubles its CWS, the LTE transmission node also preferably increases its CWS without fixing the CWS, for fair co-existence with the WiFi system.

Accordingly, embodiments of the present disclosure propose events triggering CWS adjustment and/or CWS update, and methods for applying a changed CWS will be described in detail.

4.1 CWS Adjustment Methods

As in the WiFi system, if an LTE node fails to receive an ACK after attempting a transmission, the LTE node may increase a CWS by K1 times (e.g., twice) or L1 (a linear scale). Or if the LTE node receives an ACK for the transmission, the LTE node may set the CWS to an initial value, or decrease the CWS by K2 times (e.g., ½ times) or L2.

Figure 26:
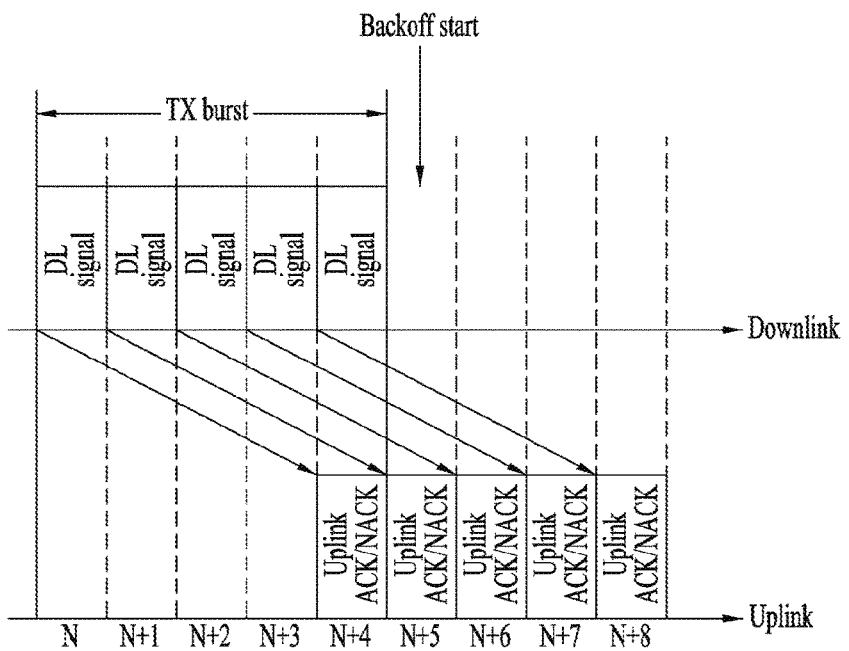
FIG. 26 is a view illustrating an operation for transmitting an ACK/NACK signal for an uplink transmission in the LTE/LTE-A system.

However, the LTE system differs from the WiFi system in that a UE transmits an ACK/NACK signal for a received DL signal at least 4 ms after a time of the reception of the DL signal in the LTE system, as illustrated in FIG. 26. This is because an ACK/NACK signal is transmitted in the transmission opportunity immediately after reception of a DL signal in the WiFi system. FIG. 26 is a view illustrating an operation for transmitting an ACK/NACK signal for a DL transmission in the LTE/LTE-A system. In embodiments of the present disclosure, the term, LTE node covers eNB and/or UE.

As in FIG. 26, it is assumed that an eNB configures a Tx burst (or TxOP) continuously spanning 5 ms from SF #N and transmits DL signals in the Tx burst. After completing the transmission in up to SF #N+4, the eNB may perform a backoff algorithm to start a Tx burst again in SF #N+5.

Herein, ACK/NACK information that the eNB may refer to is ACK/NACK information for a DL signal transmitted at the time of SF #N. That is, the transmission node should control a CWS based on an ACK/NACK signal for a DL signal transmitted at least 5 ms earlier without knowing whether a DL signal has been successfully transmitted in the latest SF, SF #N+4. Therefore, adjustment of a CWS based on an ACK/NACK received shortly before the start of a Tx burst as is done in the WiFi system may not be suitable for the LTE system.

Embodiments of the present disclosure propose methods for increasing or decreasing a CWS in consideration of technical differences between a system supporting a licensed band and a system supporting an unlicensed band.

In the embodiments of the present disclosure, increasing a CWS means increasing the CWS by K1 times or L1, and decreasing the CWS means setting the CWS to an initial value or decreasing the CWS by K2 times or L2.

Herein, "adjustment of a CWS based on an ACK/NACK received immediately before the start of a Tx burst" may specifically mean the following operation.

To update a CWS at time t, ACK/NACK(s) received in closest N_sf SF(s) from among ACK/NACK(s) received in SFs earlier by N_latest SFs may be used at time t.

Or, to update a CWS at time t, ACK/NACK(s) received for closest N_sf SF(s) from among ACK/NACK(s) received for SFs earlier by N_latest SFs may be used at time t.

Herein, N_sf may be 1, and N_latest may be a fixed or preset value in the network, or selected dynamically based on the eNB's capability of decoding an ACK/NACK and updating a CWS. The above condition that a valid ACK/NACK used for CWS update at time t is at least N_latest SFs earlier is also applicable to other embodiments of the present disclosure as set forth below.

For example, if ACK/NACK information for the first SF of a Tx burst is to be used as described in Section 4.1.1, the first SF may be an SF which has been transmitted at least N_latest SFs before time t. In another example, if ACK/NACK information in a specific number of previous Tx bursts is to be used, only ACK/NACK information in a Tx burst transmitted at least N_latest SFs before time t may be considered to be valid.

Further, as in the following embodiments, LBT parameters (e.g., CS parameters or CCA parameters) may be configured according to signals of different types (or priority classes) (e.g., signals of UEs having different service requirements, HARQ processes having different service requirements, different Quality of Service (QoS) classes, or different DL channels). The positions of the closest N_sf SFs may be determined differently according to priority classes.

4.1.1 Method for Using HARQ-ACK Information Based on Reference Subframe

An LTE transmission node may use ACK/NACK information (i.e., HARQ-ACK information) for a reference SF (e.g., first SF) configured in a Tx burst, for CWS update.

For example, 5 SFs form one Tx burst, and an eNB may transmit DL signals to a UE during the Tx burst in FIG. 26. Herein, it is assumed that 4 SFs later, the UE feeds back ACK/NACK information for a received DL signal to the eNB.

ACK/NACK information for the first SF (i.e., starting SF) SF #N of the Tx burst is ACK/NACK information received at the time of SF #N+4. The eNB may control a CWS based on the ACK/NACK information received in SF #N+4, for a DL signal in the first SF SF#N. That is, if the eNB fails to receive an ACK signal for the first SF of the Tx burst, the eNB may increase the CWS, and if the eNB receives the ACK signal for the first SF #N, the eNB may decrease the CWS. That is, the first SF may be a reference SF for CWS control. This is because an ACK/NACK signal for a DL signal is transmitted a predetermined number of SFs after reception of the DL signal in view of the nature of the LTE system, thus making it difficult to use ACK/NACK information for an SF immediately before configuration of a new Tx burst.

According to this method, however, only if a continuous Tx burst 5 ms long is to be transmitted, ACK/NACK information for the previous Tx burst may be used. However, even though a Tx burst is 5 ms or shorter, ACK/NACK information for the previous Tx burst may be used in CWS update, according to N_sf set to 1 and an N_latest value.

Herein, the position of the first SF of a Tx burst may be different according to priority classes. For example, it is assumed that for priority class 1, a transmission starts in the first SF of the Tx burst, whereas for priority class 2, a transmission starts in the second SF of the Tx burst. An SF for which ACK/NACK information to be used for CWS control has been received may be the first SF in the case of priority class 1 and the second SF in the case of priority class 2.

For example, if the eNB performs transmissions of channel access priority class p on a channel, the eNB may maintain or adjust a CW value $CW_p$ for the transmissions. First, for each priority class p ($p \in \{1, 2, 3, 4\}$), the eNB may set $CW_p$ to an initial value, $CW_{min,p}$. If a probability Z of HARQ-ACK values corresponding to PDSCH transmission(s) in reference SF k being determined to be NACK is at least 80%, the eNB increases $CW_p$ for each priority class p, and otherwise, the eNB resets the CW value to the initial value for each priority class p. Herein, reference SF k is a starting SF corresponding to a valid HARQ-ACK feedback in the latest transmission (i.e., Tx burst) of the eNB on a channel In another aspect of the present disclosure, the eNB may use only ACK/NACK information for the last SF of a Tx burst, for CWS adjustment. That is, not the first SF but the last SF of the Tx burst may be used as a reference SF in CWS adjustment. This is because use of ACK/NACK information for a recent SF in configuring a new Tx burst may increase reliability.

Herein, the position of the last SF in a Tx burst may be different according to priority classes. For example, it is assumed that for priority class 1, a transmission spans to the third SF of a Tx burst, whereas for priority class 2, a transmission spans to the fourth SF of the Tx burst. Then, a reference SF for which ACK/NACK information to be used for CWS adjustment has been received may be the third SF for priority class 1 and the fourth SF for priority class 2.

4.1.2 Method for Adjusting CWS Based on Probability

Because a current interference situation may be different from a 5-ms earlier interference situation, even though the transmission node receives NACK information at the start of a backoff algorithm for transmission of a Tx burst, the transmission node may increase the CWS with a probability of X1%. On the contrary, even though the transmission node receives ACK information at the start of the backoff algorithm for transmission of a Tx burst, the transmission node may decrease the CWS with a probability of X2%.

4.1.3 Method for Adjusting CWS Based on Statistics

In the LTE system, it is difficult to control a CWS immediately due to the limitation of an ACK timeline. Therefore, an LTE transmission node or the LTE system may configure a time window of T ms (or as many recent Tx bursts as T_burst), and control the CWS in consideration of an average interference situation during the time window. For example, if the ratio of a NACK signal is equal to or greater than Y % during T ms, the LTE transmission node may increase the CWS, whereas if the ratio of a NACK signal is less than Y % during T ms, the LTE transmission node may decrease the CWS.

In a different method, in the presence of at least one ACK during the time window, the LTE transmission node may decrease the CWS, and otherwise, the LTE transmission node may increase the CWS. Herein, the time window may be configured as a sliding window whose position is variable, or as an independent window.

For example, if the time window is configured as an independent window and T is 10 ms, the CWS may be updated based on an ACK/NACK value in each radio frame. If a sliding window is configured, a different sliding window may be applied on a priority class basis. For example, it is assumed that T_burst=1, priority class 1 was transmitted in the immediate previous Tx burst, and priority class 2 was transmitted in the second previous Tx burst, not the immediate previous Tx burst. Herein, a sliding window for CWS control may be the immediate previous Tx burst for priority class 1, and the second previous Tx burst for priority class 2.

As many recent Tx bursts as T_burst proposed by this embodiment specifically means T_burst Tx bursts transmitted at least N_latest SFs before time t at which a CWS is updated. If there are valid ACK/NACK information (available for CWS update) for at least a part (i.e., R or more SFs, e.g., R=1) of the SFs of a Tx burst, the Tx burst may be counted as T_burst.

For example, in the case where T_burst is 1 and R is 1, if there are a plurality of Tx bursts each including at least one SF corresponding to valid ACK/NACK information among SFs included in the Tx burst, only ACK/NACK information for the latest of the Tx bursts may be used for CWS update. More specifically, if any SF of a Tx burst was used for CWS update, ACK/NACK information for all SFs of the Tx burst may be considered not to be valid any longer. In other words, ACK/NACK information for all SFs of the Tx burst may be configured as unavailable at the next CWS update time.

Or, only if ACK/NACK information for all SFs of a Tx burst was used for CWS update, the ACK/NACK information for all SFs of the Tx burst may be considered not to be valid any longer. In other words, if only ACK/NACK information for a part of the SFs of a Tx burst is used for CWS update, ACK/NACK information for all SFs of the Tx burst may be configured as still valid even at the next CWS update time.

These CWS update methods are applicable to the legacy method, the afore-described methods in Sections 4.1.1 and 4.1.2, and embodiments as described below as well as this embodiment. Further, the CWS update methods are also applicable to a method for using ACK/NACK information for a predetermined number of (e.g., Q, Q is a natural number) previous Tx bursts.

4.1.4 Method for Adjusting CWS Based on Statistics—2

In the ACK/NACK statistics-based method described in Section 4.1.3, a memory and a forgetting factor may be used. For example, a function $F(N)=\rho*F(N-1)+C(N)$ may be defined. Herein, p is a real number less than 1, and C(N) represents a value derived from the number of NACKs received at the time of SF #N. If F(N) is equal to or greater than F_inc, the LTE node may increase the CWS, and if F(N) is equal to or less than F_dec, the LTE node may decrease the CWS.

4.1.5 Method for Configuring CWS for Retransmission

The LTE node may update the CWS uniformly irrespective of an initial transmission or a retransmission. However, as the number of retransmissions increases, a success probability increases due to a combining gain in view of the nature of LTE supporting HARQ. That is, even though interference is severe as in the case of collision with a WiFi node and another LTE node, the success probability increases at a retransmission relative to an initial transmission. Accordingly, minimization of interference with other nodes by attempting a transmission as fast as possible without increasing the CWS at a retransmission may be favorable to the network.

For example, CWmin value may always be used at retransmissions, independently of a CWS for an initial transmission.

In another example, in spite of failure of an initial transmission, a CWS used for the initial transmission may still be used without being increased.

In another example, a CWS used for a retransmission may be separately configured, or set through an X2 interface. Herein, the method for increasing/decreasing a CWS for an initial transmission may be applied to the legacy technology and the embodiments described in Section 4.1.1 to Section 4.1.4.

In embodiments of the present disclosure, it is assumed that a retransmission is performed in a Tx burst following a Tx burst in which an initial transmission is performed.

4.1.6 Method for Updating CWS by Distinguishing Initial Transmission from Retransmission In application of the legacy technology and the embodiments described in Section 4.1.1 to Section 4.1.4, a CWS may be updated by determining whether a transmission is an initial transmission or a retransmission. For example, the CWS may be adjusted, using only ACK/NACK information for the initial transmission.

Or without using NACK information for the initial transmission for CWS control, the legacy technology and the embodiments described in Section 4.1.1 to Section 4.1.4 may be applied. For example, even though a NACK is received for an initial transmission, a CWS may be fixed or may not be used for statistics based on which the CWS is adjusted.

Or, the conventional technology and the embodiments described in Section 4.1.1 to Section 4.1.4 may be implemented by applying only NACK information for an initial transmission, NACK information for a part of retransmissions (e.g., NACK information for a $3^{rd}$ transmission), and ACK information for all transmissions.

4.1.7 Introduction of Block ACK Scheme

A block ACK scheme may be introduced for CWS control in embodiments of the present disclosure. After transmitting a Tx burst, the eNB may transmit a block ACK request message to UEs. Upon receipt of the block ACK request message, the UEs may transmit ACK/NACKs for the received DL data in a bitmap. Upon receipt of block ACK response messages in the form of a bitmap, the eNB may control a CWS based on corresponding information.

For example, if successive NACKs for the latest transmission (i.e., Tx burst) are detected, the CWS may be increased. Or, if about 10% of NACKs are scattered, only an MCS level may be changed without increasing or decreasing the CWS (or while the CWS is decreased).

Or, if there is at least one ACK in the block ACK, the CWS may be decreased, and if the block ACK includes only NACKs or is not received, the CWS may be increased.

The block ACK request message may be transmitted in a UL grant (e.g., using additional 1-bit information) on an (E)PDCCH, and the block ACK response messages may be transmitted in the form of a bitmap in a PUSCH region allocated by the UL grant.

Or, the block ACK request message may be transmitted in a DL grant (e.g., using additional 1-bit information), and the bitmap information (i.e., the block ACK response messages) may be transmitted in a predefined or new PUCCH format.

In these embodiments, the bitmap information may include ACK/NACK information on a code block basis (or on an SF basis).

In addition, a configuration indicating SFs corresponding to ACK/NACK information to be included in the bitmap information may be needed. For example, ACK/NACK information for SFs configured from the time of requesting a block ACK to a time indicated by higher-layer signaling or physical-layer signaling may be defined as bitmap information.

Or, UEs to transmit a block ACK may be preconfigured by higher-layer signaling. Herein, the UEs may be configured to omit ACK/NACK feedbacks on a legacy PUCCH.

4.1.8 Method for Configuring Z Value for CWS Update

Whether an (E)PDCCH has been decoded or not may be used for CWS update. Since a target Block Error Rate (BLER) for the (E)PDCCH is usually 1% and HARQ is not performed for the (E)PDCCH, it may be preferred to use whether decoding of the (E)PDCCH is successful or failed rather than to use an ACK/NACK for a PDSCH. In the embodiments of the present disclosure, whether decoding of the (E)PDCCH is successful or failed may be determined based on the Discontinuous Transmission (DTX) state as HARQ-ACK information transmitted by a UE. That is, upon receipt of information related to the DTX state, the eNB may determine that the UE has not received the (E)PDCCH successfully. Accordingly, methods for using HARQ-ACK information related to DTX for CWS adjustment will be described below.

In the embodiments of the present disclosure, Self-Carrier Scheduling (SCS) refers to an eNB's transmission of an (E)PDCCH for scheduling a PDSCH or a PUSCH on an LCell subjected to CS (LBT or CCA) to determine whether the channels are valid. That is, SCS means a case that a serving cell where an (E)PDCCH has been received is identical to a serving cell where a Tx burst including a PDSCH is transmitted. Further, Cross Carrier Scheduling (CCS) refers to an eNB's transmission of an (E)PDCCH for scheduling a PDSCH or a PUSCH on a serving cell (e.g., a PCell in a licensed band, or a different channel of LCell) other than a serving cell subjected to CS. That is, CCS means a case that a serving cell where an (E)PDCCH has been received is different from a serving cell where a Tx burst including a PDSCH is transmitted.

Further, in the embodiments of the present disclosure, an HARQ-ACK information/signal is used in the same sense as an ACK/NACK information/signal. Further, the HARQ-ACK information/signal may represent at least one of an "ACK" state, a "NACK" state, a "DTX" state, or "ANY" state.

Now, a method for updating a CWS in the case of SCS will be described.

In SCS, HARQ-ACK information corresponds to PDSCH transmission(s) allocated to the same LAA serving cell by an (E)PDCCH transmitted in the LAA serving cell. Herein, in the absence of an HARQ-ACK feedback, or upon detection of the 'DTX', 'NACK/DTX', or 'ANY' state from HARQ-ACK information, the eNB may consider the corresponding state as NACK. That is, the eNB may determine a Z value by counting the 'DTX', 'NACK/DTX', or "ANY" state as NACK and update a CWS based on the determined Z value.

DTX (or DTX and NACK) statistics of SCS UEs may be used, and may be extended to the conventional technology and the embodiments described in Section 4.1.1 to Section 4.1.4. For example, for the embodiment described in Section 4.1.3, a DTX ratio (or DTX and NACK ratio) may be used, instead of a NACK ratio, and for the embodiment described in Section 4.1.4, C(N) may mean a value derived from the number of DTXs (or DTXs and NACKs) received at the time of SF #N.

More specifically, an eNB which is one of LTE transmission nodes may count the 'DTX' and/or 'ANY' state of HARQ-ACK information transmitted by UEs scheduled by SCS as NACK. The 'DTX' state means a state in which a UE fails to receive a PDSCH due to non-reception of scheduling information and thus does not transmit an HARQ-ACK. The 'ANY' state means any HARQ-ACK information including ACK, NACK, and DTX.

That is, to determine a Z value for use in updating the CWS, the eNB may determine a Z value by regarding DTX as NACK. Further, the eNB may determine the Z value by regarding the ANY state as NACK in order to update the CWS. Therefore, if a self-scheduled UE transmits the DTX or ANY state as an HARQ-ACK feedback to the eNB, the eNB may determine a Z value by considering the corresponding value as NACK and increase or decrease the CWS based on the determined Z value.

Hereinbelow, a method for updating a CWS in the case of CCS will be described.

In CCS, HARQ-ACK information corresponds to PDSCH transmission(s) allocated to an LAA serving cell by an (E)PDCCH transmitted in another serving cell. Upon detection of the 'NACK/DTX' or 'ANY' state from HARQ-ACK information as a corresponding HARQ-ACK feedback, the eNB may regard the corresponding state as NACK, and upon detection of the 'DTX' state, the eNB may ignore it. That is, the eNB may determine a Z value by counting the 'NACK/DTX' or 'ANY' state as NACK and update the CWS based on the determined Z value.

That is, in the case of CCS, the eNB may determine a Z value, ignoring the DTX state, and update the CWS based on the determined Z value.

If the transmission node fails to receive ACK/NACK information or receives DTX as feedbacks from CCS UEs, the transmission node may not use the corresponding information for CWS control.

More specifically, an eNB which is one of LTE transmission nodes may not count 'DTX' received from UEs scheduled by CCS as NACK.

That is, to determine a Z value for use in CWS update, the eNB may determine the Z value without regarding DTX for a PDSCH scheduled by CCS as NACK. Therefore, if a cross-scheduled UE feeds back the DTX state to the eNB, the eNB may determine a Z value, ignoring the corresponding value, and increase or decrease the CWS based on the determined Z value. That is, only the 'ACK', 'NACK', 'NACK/DTX', and 'ANY' states in HARQ-ACK feedback information for a PDSCH scheduled by CCS may be used for CWS update.

In general, if the transmission node fails to receive an ACK/NACK or receives a feedback of DTX, the transmission node may not reflect the feedback information in CWS control or increase the CWS, irrespective of SCS or CCS. Or, if the transmission node has not received J or more ACK/NACKs or has received J or more feedbacks of DTX, the transmission node may increase the CWS.

These embodiments are readily applicable to Sections 4.1.5 and 4.1.6 as well as the conventional technology and the embodiments described in Section 4.1.1 to Section 4.1.4. For example, if the transmission node fails to receive an ACK/NACK or receives a feedback of DTX only for an initial transmission, the transmission node may increase the CWS. Or if the transmission node fails to receive an ACK/NACK or receives a feedback of DTX for a retransmission, the transmission node may increase the CWS. Or the transmission node may update the CWS based on HARQ-ACK information for both an initial transmission and a retransmission.

In the embodiments of the present disclosure, the 'NACK/DTX', 'DTX', and/or 'ANY' state is regarded as NACK or ignored depending on SCS or CCS for the following reason.

DTX may eventually mean that a UE has failed to receive an (E)PDCCH. Herein, a PDCCH is transmitted in an LAA SCell in the case of SCS, whereas the PDCCH is transmitted in a serving cell of a licensed band in the case of CCS. In other words, since the DTX state indicates the UE's failure of decoding the (E)PDCCH in the LAA SCell, the DTX state is preferably regarded as NACK in the case of SCS. On the other hand, since the DTX state is for the PDCCH in the serving cell of the licensed band with no relation to the LAA SCell in the case of CCS, the DTX state is unnecessary information in the case where the eNB adjusts the CWS for the LAA SCell.

Since it is assumed that the 'NACK/DTX' state or the 'ANY' state covers the NACK state, that is, the eNB is not capable of explicitly determining whether the 'NACK/DTX' state or the 'ANY' state is NACK, DTX, or ACK, the eNB may conservatively regard the 'NACK/DTX' state or the 'ANY' state as NACK, for CWS update. Therefore, a Channel Access Procedure (CAP) may be performed stably for the LAA SCell.

4.1.9 Timer-Based CWS Update Method

In the above-described embodiments of the present disclosure, it may configured that a timer value T_valid is set, and if ACK/NACK information has not been received within the time period, a CWS is decreased. For example, even in an embodiment of controlling a CWS based on the latest ACK/NACK information, a transmission node may decrease a CWS in the absence of ACK/NACK information during T_valid. This may readily be extended to the embodiments described in Section 4.1.1 to Section 4.1.8.

Further, different timer values T_valid may be set for different priority classes. For example, in the absence of ACK/NACK information for priority class 1 during a timer value, the transmission node may decrease a CWS for priority class 1 (or every priority class).

Or, the CWS decrease condition may be applied only when it is satisfied for a specific priority class. For example, in the absence of ACK/NACK information for the lowest priority class for T_valid, the transmission node may decrease all of CWSs for the lowest priority class and the other priority classes.

Or, the CWS decrease condition may be applied only when it is satisfied for all priority classes. For example, in the absence of ACK/NACK information during T_valid or longer, the transmission node may decrease the CWSs for all priority classes.

4.1.10 Method for Updating CWS Based on HARQ Process

A Transport Block (TB) may be dropped for such a reason as W1 occurrences of retransmissions for a specific HARQ process or non-completion of transmissions for the specific HARQ process during a time period T1. Upon occurrence of such TB dropping, a transmission node may decrease a CWS.

More specifically, if N1 or more TBs have been dropped, the transmission node may decrease the CWS.

Or, if N1 or more TBs have been dropped during a time period T2, the transmission node may decrease the CWS.

Or, if N1 or more TBs have been dropped (within T2) or CWmax has been used for N2 successive LBT operations, the transmission node may decrease the CWS.

Or, if CWmax has been used N3 or more times for an LBT operation for transmission of a DL Tx burst including a dropped TB, the transmission node may decrease the CWS.

In the embodiments of the present disclosure, W1, T1, T2, N1, N2, and/or N3 may be set to be equal or different according to priority classes. For example, it may be configured that if CWmax for priority class 1 has been used for N2 successive LBT operations, a CWS for priority class 1 (or every priority class) is decreased.

Or, in this embodiment, the CWS decrease condition may be applied only when it is satisfied for a specific priority class. For example, if CWmax for the lowest priority class has been used for N2 successive LBT operations, all of CWSs for the lowest priority class and the other priority classes may be decreased.

Or, in this embodiment, the CWS decrease condition may be applied when it is satisfied for all priority classes. For example, if CWmax for all priority classes has been used for N2 successive LBT operations, CWSs for all the priority classes may be decreased.

In one aspect of this embodiment, it may be assumed that each time an ECCA backoff count is drawn, a CWS is updated. In this case, if in the absence of transmission data, the transmission node uses CWmax N2 times during a plurality of ECCA operations, the transmission node may decrease the CWS. However, the transmission node preferably distinguishes continuous selections of an ECCA count during the absence of transmission data from continuous selections of an ECCA count for retransmissions. For example, use of CWmax during the absence of transmission data in the transmission node may have nothing to do with "the operation of decreasing the CWS due to N2 uses of CWmax".

In the above methods, regarding collection of statistics of ACK/NACK information, it may be configured that ACK/NACK information from a specific number of (Q) previous Tx bursts is used. If the Q previous Tx bursts were transmitted for too long a time, out-of-dated ACK/NACK information may be used in the statistics. Accordingly, it may be configured that only Tx burst information during T_out is used.

That is, if Q Tx bursts exist within T_out, the transmission node may use all of the Q Tx bursts to update the CWS. Further, only if the Q Tx bursts do not exist within T_out, the transmission node may use ACK/NACK information in Tx bursts within T_out in the statistics.

In the above-described embodiments of the present disclosure, parameters K1, K2, L1, L2, X1, X2, T, Y, J, ρ, F_inc, F_dec, T_valid, W1, T1, T2, N1, N2, and/or N3 may be preset or configured via an X2 interface. Herein, the parameters may be configured to have equal or different values according to priority classes.

In the case where a scheduled UE transmits a UL channel corresponding to a CSS or SSS UL grant that the eNB has transmitted, the same operation as in the case of receiving ACK information in the proposed methods may be performed.

For example, upon receipt of a UL channel corresponding to a transmitted UL grant, the eNB may decrease a CWS. On the contrary, if the eNB fails to receive the UL channel corresponding to the transmitted UL grant, the eNB may perform the same operation as in the case of receiving NACK information in the foregoing embodiments.

Or, considering that the UE may receive the UL grant but fail in an LBT operation for transmission of the UL channel corresponding to the UL grant, if the eNB fails to receive the UL channel corresponding to the transmitted UL grant, the eNB may not reflect the non-reception of the UL channel in setting a CWS.

4.11 Channel Access Procedure and Contention Window Adjustment Procedure

Hereinbelow, the afore-described Channel Access Procedure (CAP) and Contention Window Adjustment (CWA) will be described from the viewpoint of a transmission node.

Figure 27:
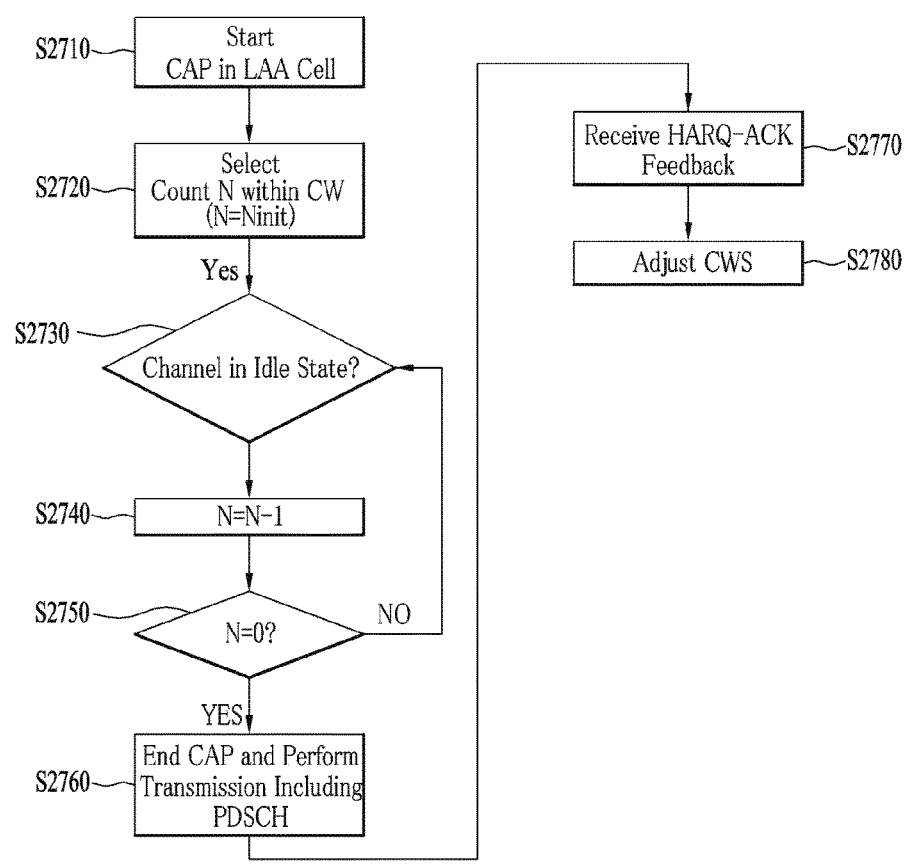
FIG. 27 is a view illustrating a Channel Access Procedure (CAP) and Contention Window Adjustment (CWA)

FIG. 27 is a view illustrating the CAP and CWA.

For a DL transmission, an LTE transmission node (e.g., an eNB) may initiate the CAP to operate in unlicensed cell(s), LAA SCell(s) (S2710).

The eNB may select a backoff count N randomly within a CW. Herein, N is set to an initial value Ninit (S2720).

The eNB determines whether a channel of LAA SCell(s) is idle, and if the channel is idle, decreases the backoff count by 1 (S2730 and S2740).

In FIG. 27, the order of steps S2730 and S2740 may be changed. For example, the eNB may first decrease the backoff count N and then determine whether the channel is idle.

If the channel is not idle, that is, the channel is busy in step S2730, the eNB may determine whether the channel is idle during a defer duration (equal to or longer than 25 μsec) longer than a slot duration (e.g., 9 μsec). If the channel is idle during the defer duration, the eNB may perform the CAP again. For example, if the backoff count Ninit is 10 and after the backoff count is decreased to 5, the eNB determines that the channel is busy, the eNB determines whether the channel is idle by sensing the channel during the defer duration. If the channel is idle during the defer duration, the eNB may perform the CAP again, starting the backoff count from 5 (or from 4 after the backoff count is decreased by 1), instead of setting the backoff count Ninit.

Referring to FIG. 27 again, the eNB may determine whether the backoff count N is 0 (S2750). If the backoff count N is 0, the eNB may end the CAP process and transmit a Tx burst including a PDSCH (S2760).

The eNB may receive HARQ-ACK information for the Tx burst from a UE (S2770).

The eNB may adjust a CWS based on the received HARQ-ACK information (S2780).

In step S2780, the CWS may be adjusted in any of the methods described in Section 4.1.1 to Section 4.1.10. For example, the eNB may adjust the CWS based on HARQ-ACK information for the first SF (i.e., the starting SF) of the latest transmitted Tx burst.

Herein, before performing CWP, the eNB may set an initial CW for each priority class. Subsequently, if the probability of determining HARQ-ACK values for a PDSCH transmitted in a reference SF to be NACK is at least 80%, the eNB increases the CW value set for each priority class to an allowed next level.

In step S2760, the PDSCH may be allocated by SCS or CCS. If the PDSCH is allocated by SCS, the eNB counts the DTX, NACK/DTX, or ANY state indicated by feedback HARQ-ACK information as NACK. If the PDSCH is allocated by CCS, the eNB counts the NACK/DTX and ANY states indicated by feedback HARQ-ACK information as NACK meanwhile the eNB does not count the DTX state indicated by feedback HARQ-ACK information as NACK.

If M (M>=2) SFs are bundled and bundled HARQ-ACK information is received, the eNB may regard the bundled HARQ-ACK information as M HARQ-ACK responses. Preferably, the bundled M SFs include a reference SF.

Figure 28:
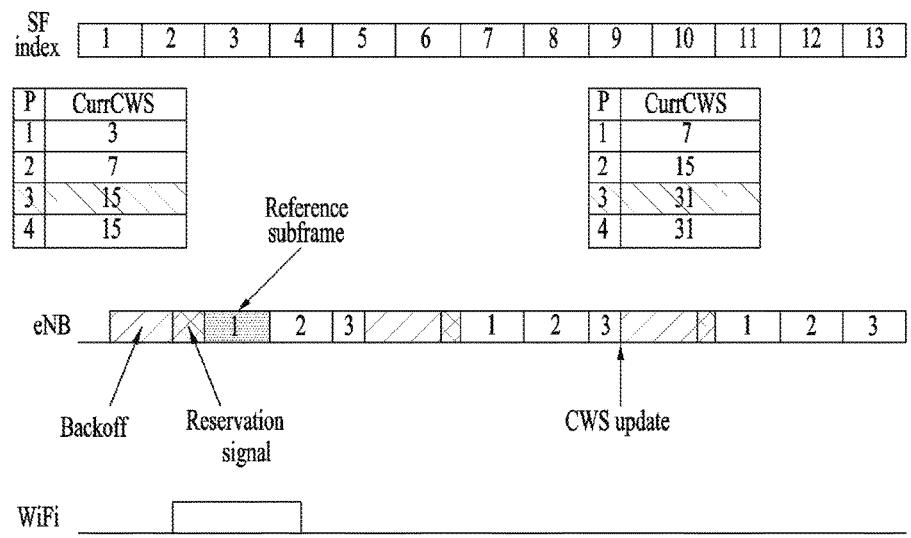
FIG. 28 is a view illustrating a method for adjusting a Contention Window Size (CWS)

FIG. 28 is a view illustrating a CWS adjustment method.

In FIG. 28, the top part indicates SF indexes of an LAA SCell operating in an unlicensed band, corresponding to SF indexes of a PCell operating in a licensed band. In FIG. 28, a Tx burst spans three SFs, and for the convenience of description, Tx bursts are transmitted in one LAA SCell. Obviously, the same thing is applicable to a plurality of LAA SCells in the following embodiments.

Referring to FIG. 28, the eNB has data to be transmitted at the time of SF #1, and sets current CWSs, CurrCWS, to initial values 3, 7, 15, and 15 for respective priority classes (p=1 to 4).

If the eNB is to access a channel using an LBT parameter corresponding to priority class 3 and transmit DL traffic corresponding to priority class 3, the eNB selects one integer randomly from a range of [0, 15] as a backoff count.

If a time when the randomly selected integer becomes 0 does not match to an SF boundary, the eNB may transmit a reservation signal to occupy the channel, and performs a transmission including a PDSCH in three SFs starting with SF #3.

The eNB ends the DL transmission in the middle of SF #5, and adjusts the CWS shortly before an LBT operation (i.e., CAP) for a new DL transmission. However, since the eNB may not expect an HARQ-ACK response for the "PDSCH transmitted in SF #3" at the time of SF #5 in view of the nature of the LTE-A system (i.e., due to a 4-ms delay of an HARQ-ACK response), the eNB may perform the LBT operation using the same LBT parameter without CWS adjustment.

When the eNB ends the DL transmission in SF #9 and starts a new LBT operation, the eNB may expect an HARQ-ACK response for the Tx burst transmitted in SF #3 to SF #5. If the probability of regarding HARQ-ACK response(s) for the PDSCH(s) transmitted in SF#3 as NACK is equal to or greater than 80%, the eNB may increase the CWS.

Herein, since the eNB may not expect an HARQ-ACK response for a PDSCH transmitted in SF #7, SF #7 may not be a reference SF even though SF #7 is the first SF of the latest DL burst. That is, a reference SF means the first SF of the latest Tx burst for which an HARQ-ACK feedback is possible. Therefore, referring to FIG. 28, a reference SF for use in adjusting the CWS in SF #9 may be set to SF #3 included in the latest Tx burst for which an HARQ-ACK response is possible.

In another aspect of the present disclosure, it is assumed that due to a WiFi signal starting to be transmitted at the same time as a reservation signal in SF #2 as in the example of FIG. 28, UEs fail to receive a PDSCH at the time of SF #3 and thus feed back NACKs.

Thus, the eNB may increase the CWS, when updating or adjusting LBT parameters in SF #9. Herein, CWS values for all priority classes including priority class 3 are increased to the next higher values (e.g., 7, 15, 31, and 31) (among defined values).

4.12. Methods for Setting Z Value for CWS Adjustment

Figure 29:
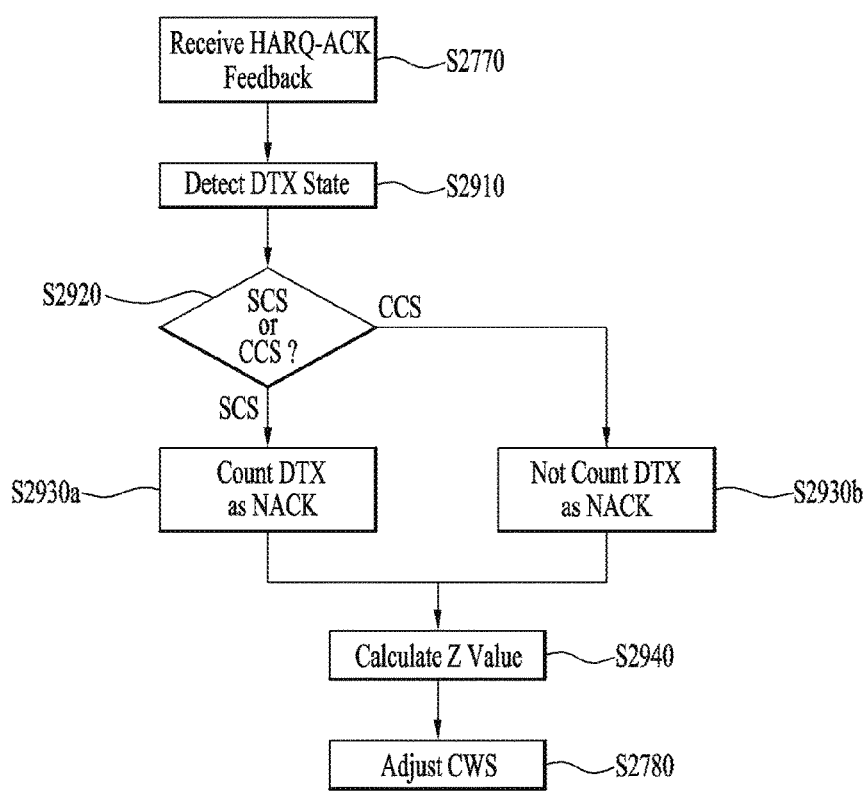
FIG. 29 is a view illustrating one of methods for setting a Z value for CWS adjustment.

FIG. 29 is a view illustrating one of methods for setting a Z value for CWS adjustment.

FIG. 29 may be performed between steps S2770 and S2780 of FIG. 27. Particularly, the procedure illustrated in FIG. 29 may be performed in order to determine a probability value Z of detecting the NACK state for CWS adjustment.

Referring to FIG. 29, an eNB may detect the DTX state from the HARQ-ACK information received in step S2770 (S2910).

The DTX state may be used in a different manner depending on whether an SF or Tx burst corresponding to the HARQ-ACK information is scheduled by SCS or CCS (S2920).

In the case of SCS, the eNB may allocate a Tx burst to a serving cell of an unlicensed band by transmitting an (E)PDCCH including scheduling information in the same serving cell. That is, the eNB may transmit an (E)PDCCH and a Tx burst in the same LAA serving cell.

In the case of CCS, the eNB may allocate a Tx bust to another serving cell by transmitting an (E)PDCCH including scheduling information in a serving cell of a licensed band or an unlicensed band. That is, the eNB may transmit an (E)PDCCH and a Tx burst in different serving cells.

If the eNB performs scheduling by SCS, the eNB may count the DTX state, the NACK/DTX state, or the ANY state as NACK (S2930a).

On the other hand, if the eNB performs scheduling by CCS, the eNB may not count the DTX state as NACK, and may count the NACK/DTX state or the ANY state as NACK (S2930b).

As described above, the eNB may interpret a received DTX state differently according to SCS or CCS. That is, the eNB calculates a Z value by counting the received DTX state as NACK in SCS, and does not use the received DTX state in CWS adjustment in CCS (S2940).

In step S2940, the eNB may calculate a Z value by regarding the NACK/DTX state and the ANY state as NACK in SCS and CCS.

The eNB may adjust the CWS based on the calculated Z value (S2780).

4.2 Time for Applying Contention Window Size

Now, a description will be given of a time for updating an adjusted CWS, upon occurrence of an event triggering a CWS change.

4.2.1 Method 1

Each time the transmission node starts an LBT operation for a Tx burst and draws an ECCA backoff count N, the transmission node may update the CWS. In the absence of valid (or new) HARQ-ACK information at a CWS update time, the transmission node may not update the CWS or may decrease the CWS.

4.2.2 Method 2

Each time valid (or new) HARQ-ACK information is generated, the transmission node may update the CWS. The updated CWS may actually be applied when an ECCA backoff count is set for a Tx burst after the CWS update.

4.2.3 Method 3

When the transmission node actually has transmission data and performs an ECCA operation (i.e., CAP, CCA, CS, or the like) for transmission of the data, the transmission node may update the CWS. For example, even in the absence of transmission data, the transmission node may have been performing ECCA. In this case, the transmission node may not update the CWS. In the presence of actual transmission data, the transmission node may update the CWS and perform ECCA based on the updated CWS.

4.3. Method for Distinguishing Collision from Channel Error

In embodiments of the present disclosure, a collision means that when data is transmitted and received in a contention-based manner, a reception node fails to receive data due to simultaneous transmission of data from two or more transmission nodes.

Meanwhile, a channel error means that in a contention-based data transmission and reception environment, an adjacent transmission node causes interference to a channel and thus data is not transmitted and received normally. In view of the nature of the contention-based transmission scheme in an unlicensed band, a reception node (e.g., UE) may suffer from severe interference from another adjacent transmission node. In this case, the UE fails to receive most of the information bits of corresponding DL data, thereby causing buffer corruption.

For example, if buffer corruption occurs to the UE, even though a transmission node (e.g., eNB) transmits DL data with only a Redundancy Version (RV) changed after receiving a NACK, the UE may fail to receive data continuously. Accordingly, if the UE fails in receiving a DL signal due to severe interference from an adjacent transmission node, the UE preferably notifies the eNB of the failure in any manner. In this case, the eNB may attempt a retransmission using RV0 including lots of information bits to the UE.

In other words, if the UE is capable of feeding back information indicating severe interference from an adjacent transmission node to the eNB, the eNB may preferably take a different action according to the feedback information. That is, when the UE transmits a NACK signal, the UE needs to feed back to the eNB information indicating whether the reception failure of the corresponding data is caused by a channel collision or a channel error.

4.3.1 Method for Determining Channel Error

Hereinbelow, methods for determining whether a channel error has occurred will be described.

If a UE fails in receiving a DL signal due to a significantly increased interference component without a large change in a signal component value measured from a serving eNB, the UE may determine that the DL signal reception failure is caused by interference from an adjacent interfering node.

For example, if the UE senses an interference greater than an average interference by about Q dB during DL signal reception, the UE may determine that the adjacent transmission node causes severe interference. Herein, Q may be predefined or indicated by a higher-layer signal.

In another example, the UE may determine whether an error has occurred to a corresponding channel based on ACK/NACK statistics.

In another example, upon generation of M successive NACKs, the UE may determine that an error has occurred to the corresponding channel

4.3.2 Method for Transmitting Channel Error Feedback

Methods for transmitting a feedback indicating a channel error or collision situation to an eNB by a UE will be described below.

If the UE determines a channel error in the methods described in Section 4.3.1 (i.e., if a specific condition is satisfied), the UE may notify the eNB of the channel error in the following methods.

(1) The UE may not transmit an ACK/NACK.
(2) The UE may transmit a feedback corresponding to a Rel-12 DTX state feedback.
(3) The UE may define a new state other than ACK/NACK/DTX in HARQ-ACK information and feed back the new state.
(4) If the UE determines a collision, the UE may transmit feedback information in a PUCCH format configured as a fallback mode.

For example, if PUCCH format 3 is configured for a UE, the UE is configured to fall back to PUCCH format 1a or 1b, if the UE receives a PDSCH only in a PCell in the legacy LTE system. That is, even though the UE misses a DL grant for a PDSCH received in a cell other than the PCell, the UE may perform this operation. However, if the UE is triggered to signal whether a collision has occurred, even though the UE fails in receiving a DL grant for a PDSCH received in a cell other than the PCell, the UE may transmit legacy ACK/NACK information in PUCCH format 3 and, at the same time, indicate in PUCCH format 1a or 1b whether a collision has occurred.

(5) The eNB may configure two PUCCH formats simultaneously for the UE. Herein, the UE may feed back legacy ACK/NACK information in one of the PUCCH formats, and collision information in the other PUCCH format.

(6) The UE may indicate to the eNB whether a collision or a channel error has occurred by higher-layer signaling. For example, the UE may indicate to the eNB whether a collision or a channel error has occurred by a MAC CE measurement report message.

(7) When transmitting a PUCCH, the UE may indicate whether a collision or a channel error has occurred by adding 1 bit. For example, information indicating whether a collision or a channel error has occurred may be fed back in PUCCH format 2a, 2b, or 3, or a new PUCCH format.

(8) When transmitting UCI, the UE may indicate whether a collision or a channel error has occurred by adding a 1-bit flag. For example, information indicating whether a collision or a channel error has occurred may be fed back in PUCCH format 2a, 2b, or 3, or a new PUCCH format.

If the above methods are used, the eNB may be aware that the UE is severely interfered by an adjacent node. Therefore, the eNB may apply the methods described in Section 4.1.1 to Section 4.1.11, using only corresponding information (or using the corresponding information and NACK information together).

5. Apparatuses

Figure 30:
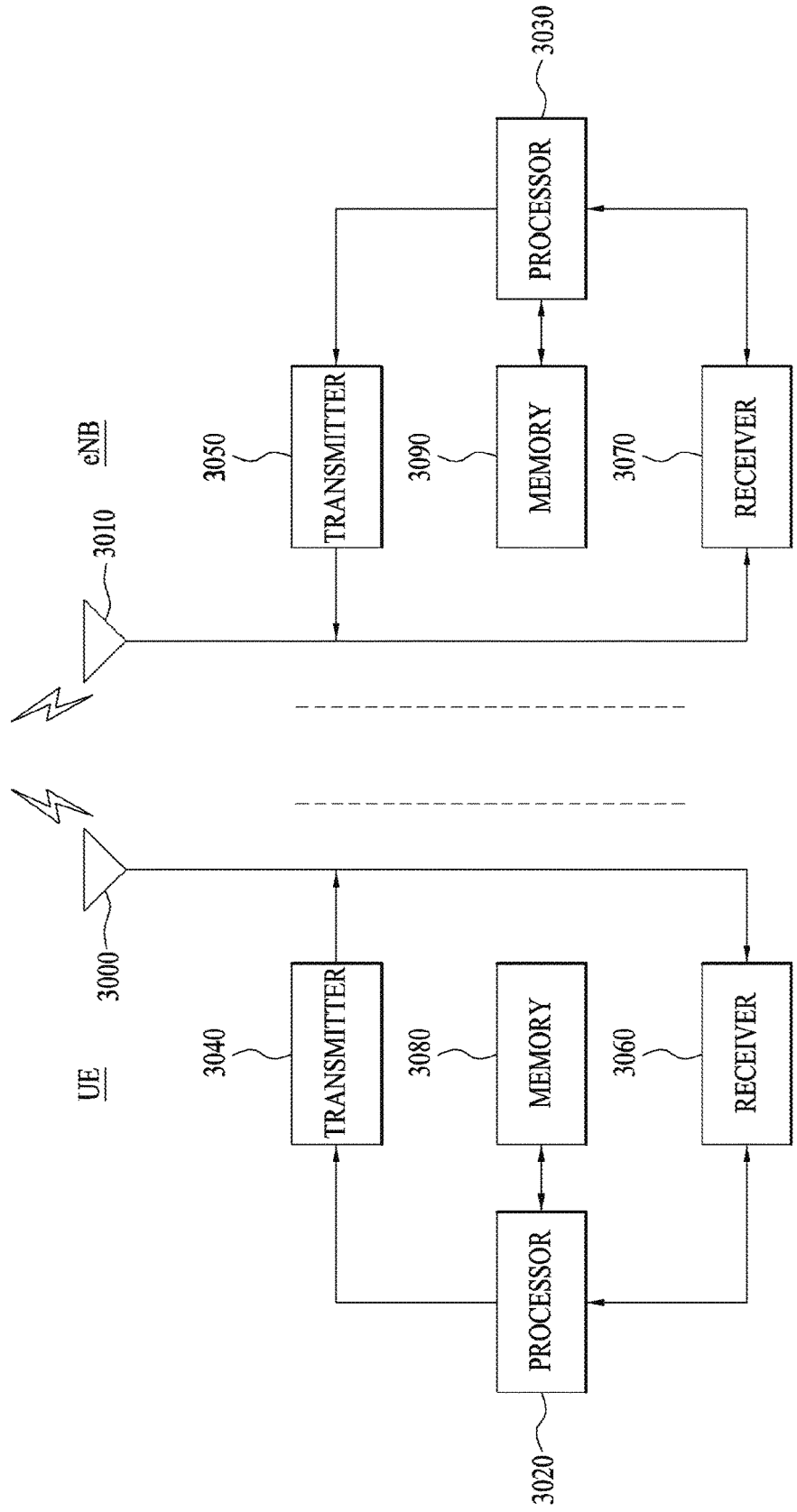
FIG. 30 is a block diagram of apparatuses for implementing the methods illustrated in FIGS. 1 to 29.

Apparatuses illustrated in FIG. 30 are means that can implement the methods described before with reference to FIGS. 1 to 29.

A UE may act as a transmission end on a UL and as a reception end on a DL. An eNB may act as a reception end on a UL and as a transmission end on a DL.

That is, each of the UE and the eNB may include a Transmitter (Tx) 3040 or 3050 and a Receiver (Rx) 3060 or 3070, for controlling transmission and reception of information, data, and/or messages, and an antenna 3000 or 3010 for transmitting and receiving information, data, and/or messages.

Each of the UE and the eNB may further include a processor 3020 or 3030 for implementing the afore-described embodiments of the present disclosure and a memory 3080 or 3090 for temporarily or permanently storing operations of the processor 3020 or 3030.

The embodiments of the present disclosure may be implemented using the components and functions of the above-described UE and eNB. For example, the processor the eNB may determine a CAP (CS or CAA) to determine whether an LAA cell is idle by controlling the transmitter and the receiver. Herein, a CWS used in the CAP may be adjusted based on HARQ-ACK information for the first SF of a Tx burst. Further, the processor of the eNB may use HARQ-ACK information differently according to a scheduling scheme for a Tx burst. For example, in the case of SCS, the processor of the eNB may adjust a CWS by regarding the DTX state as NACK and thus counting the DTX state as NACK. For the specific embodiments, refer to Section 1 to Section 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 30 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3080 or 3090 and executed by the processor 3020 or 3030. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for adjusting a contention window size (CWS) in a wireless access system supporting an unlicensed band, the method comprising:
    performing a channel access procedure;
    transmitting a transmission burst including a downlink signal in the unlicensed band, when it is determined as a result of the channel access procedure that a serving cell (SCell) of the unlicensed band is an idle state;
    receiving hybrid automatic repeat and request acknowledgment (HARQ-ACK) information corresponding to the transmission burst; and
    adjusting the CWS based on a number of discontinuous transmission (DTX) states in the HARQ-ACK information, when the transmission burst is scheduled by a self-carrier scheduling.

2. The method according to claim 1, wherein a DTX state is counted as a negative ACK (NACK) state for adjusting the CWS.

3. The method according to claim 2, wherein a NACK/DTX state and an ANY state in the HARQ-ACK information are also counted as the NACK state.

4. The method according to claim 1, wherein the DTX states in the HARQ-ACK information are not used for adjusting the CWS, when the transmission burst is scheduled by a cross-carrier scheduling.

5. The method according to claim 1, wherein the HARQ-ACK information used for adjusting the CWS is HARQ-ACK information corresponding to a first subframe of the transmission burst.

6. A transmission node configured to adjust a contention window size (CWS) in a wireless access system supporting an unlicensed band, the transmission node comprising:
    a transmitter;
    a receiver; and
    a processor for supporting CWS adjustment,
    wherein the processor controls the transmitter and the receiver in order to perform a channel access procedure, controls the transmitter to transmit a transmission burst including a downlink signal in the unlicensed band when it is determined as a result of the channel access procedure that a serving cell (SCell) of the unlicensed band is an idle state, controls the receiver to receive hybrid automatic repeat and request acknowledgment (HARQ-ACK) information corresponding to the transmission burst, and adjusts the CWS based on a number of discontinuous transmission (DTX) states in the HARQ-ACK information, when the transmission burst is scheduled by a self-carrier scheduling.

7. The transmission node according to claim 6, wherein a DTX state is counted as a negative ACK (NACK) state to adjust the CWS.

8. The transmission node according to claim 7, wherein a NACK/DTX state or an ANY state in the HARQ-ACK information is also counted as the NACK state.

9. The transmission node according to claim 6, wherein the DTX states in the HARQ-ACK information are not used for the CWS adjustment when the transmission burst is scheduled by a cross-carrier scheduling.

10. The transmission node according to claim 6, wherein the HARQ-ACK information used for the CWS adjustment is HARQ-ACK information corresponding to a first subframe of the transmission burst.

* * * * *